(12) United States Patent
Huang

(10) Patent No.: US 8,499,487 B2
(45) Date of Patent: Aug. 6, 2013

(54) FISHING POLE GRIP

(76) Inventor: Ben Huang, Huntington Beach, CA (US)

( * ) Notice: Subject to any disclaimer, the term of this patent is extended or adjusted under 35 U.S.C. 154(b) by 0 days.

(21) Appl. No.: 13/526,323

(22) Filed: Jun. 18, 2012

(65) Prior Publication Data

US 2012/0255216 A1    Oct. 11, 2012

Related U.S. Application Data

(63) Continuation of application No. 12/848,052, filed on Jul. 30, 2010, now Pat. No. 8,201,357, which is a continuation of application No. 12/045,639, filed on Mar. 10, 2008, now Pat. No. 7,770,321.

(60) Provisional application No. 60/895,668, filed on Mar. 19, 2007.

(51) Int. Cl.
   *A01K 87/00*    (2006.01)
(52) U.S. Cl.
   USPC .......................................... 43/23; 43/18.1 R
(58) Field of Classification Search
   USPC ....................................... 43/23, 18.1 R, 18.5
   See application file for complete search history.

(56) References Cited

U.S. PATENT DOCUMENTS

| | | | |
|---|---|---|---|
| 571,025 A | 11/1896 | Spamer | |
| 834,711 A | 10/1906 | Clarke et al. | |
| 979,266 A | 12/1910 | Dean | |
| 1,008,604 A | 11/1911 | Lake | |
| 1,017,565 A | 2/1912 | Lard | |
| 1,139,843 A | 5/1915 | Brown | |
| 1,345,505 A | 7/1920 | Persons | |
| 1,435,088 A | 11/1922 | Smith | |
| 1,480,056 A | 1/1924 | Flint | |
| 1,522,635 A | 1/1924 | Kraeuter | |
| 1,528,190 A | 3/1925 | Howe | |
| 1,617,972 A | 2/1927 | Wallace | |
| 1,701,856 A | 2/1929 | Kraeuter | |
| 1,890,037 A | 11/1930 | Johnson | |
| 1,943,399 A | 1/1934 | Smith | |
| 2,000,295 A | 5/1935 | Oldham | |
| 2,086,062 A | 7/1937 | Bray | |
| 2,103,889 A | 12/1937 | Brisick | |
| 2,115,119 A | 4/1938 | Park | |
| 2,149,911 A | 3/1939 | East | |

(Continued)

FOREIGN PATENT DOCUMENTS

| | | |
|---|---|---|
| CN | 2090283 | 12/1991 |
| CN | 2139008 Y | 7/1993 |

(Continued)

OTHER PUBLICATIONS

A. Zosel, Adhesion and tack of polymers: Influence of mechanical properties and surface tension, Colloid & Polymer Science 263:541-553 (1985) in 13 pages.

(Continued)

*Primary Examiner* — Christopher P Ellis
(74) *Attorney, Agent, or Firm* — Knobbe Martens Olson & Bear LLP

(57) ABSTRACT

The grip of certain embodiments includes a flexible mounting tube that can engage a rod and a sheet that including a polymer outside layer and inside layer and is attached to the tube. The sheet includes a friction enhancing feature and can have a seam joining edges of the sheet in either a substantially vertical or a substantially helical fashion.

26 Claims, 28 Drawing Sheets

U.S. PATENT DOCUMENTS

| | | |
|---|---|---|
| 2,206,056 A | 7/1940 | Sheesley |
| 2,221,421 A | 11/1940 | Curry |
| 2,225,839 A | 12/1940 | Moore |
| 2,449,575 A | 9/1948 | Wilhelm |
| 2,523,637 A | 9/1950 | Stanfield et al. |
| 2,671,660 A | 3/1954 | Goodwin |
| 2,690,338 A | 9/1954 | Brocke |
| 2,772,090 A | 11/1956 | Brandon |
| 2,934,285 A | 4/1960 | Niehaus |
| 2,984,486 A | 5/1961 | Jones |
| 3,028,283 A | 4/1962 | Lundgren et al. |
| 3,059,816 A | 10/1962 | Goldstein |
| 3,073,055 A | 1/1963 | Edwards et al. |
| 3,087,729 A | 4/1963 | Sullivan |
| 3,095,198 A | 6/1963 | Gasche |
| 3,140,873 A | 7/1964 | Goodwin |
| 3,157,723 A | 11/1964 | Hochberg |
| 3,252,706 A | 5/1966 | Rosasco, Sr. |
| 3,311,375 A | 3/1967 | Onions |
| 3,366,384 A | 1/1968 | Lamkin et al. |
| 3,368,811 A | 2/1968 | Finney |
| 3,503,784 A | 3/1970 | Okayama et al. |
| 3,606,325 A | 9/1971 | Lamkin et al. |
| 3,697,315 A | 10/1972 | Mine |
| 3,857,745 A | 12/1974 | Grausch et al. |
| 3,876,320 A | 4/1975 | Phillipson |
| 3,922,402 A | 11/1975 | Shimamura et al. |
| 3,973,348 A | 8/1976 | Shell |
| 3,992,021 A | 11/1976 | Tobin |
| 4,012,039 A | 3/1977 | Yerke |
| 4,015,851 A | 4/1977 | Pennell |
| 4,052,061 A | 10/1977 | Stewart |
| 4,133,529 A | 1/1979 | Gambino |
| 4,137,360 A | 1/1979 | Reischl |
| 4,216,251 A | 8/1980 | Nishimura et al. |
| 4,284,275 A | 8/1981 | Fletcher |
| 4,347,280 A | 8/1982 | Lau et al. |
| 4,358,499 A | 11/1982 | Hill |
| 4,373,718 A | 2/1983 | Schmidt |
| 4,448,922 A | 5/1984 | McCartney |
| 4,453,332 A | 6/1984 | Wightman |
| 4,535,649 A | 8/1985 | Stahel |
| 4,582,459 A | 4/1986 | Benit |
| 4,613,537 A | 9/1986 | Krüpper |
| 4,651,991 A | 3/1987 | McDuff |
| 4,662,415 A | 5/1987 | Proutt |
| 4,765,856 A | 8/1988 | Doubt |
| 4,878,667 A | 11/1989 | Tosti |
| 4,919,420 A | 4/1990 | Sato |
| 4,941,232 A | 7/1990 | Decker et al. |
| 4,971,837 A | 11/1990 | Martz et al. |
| 5,024,866 A | 6/1991 | Goode |
| 5,055,340 A | 10/1991 | Matsumura et al. |
| 5,118,107 A | 6/1992 | Bucher |
| 5,123,646 A | 6/1992 | Overby et al. |
| 5,127,650 A | 7/1992 | Schneller |
| 5,261,665 A | 11/1993 | Downey |
| 5,322,290 A | 6/1994 | Minami |
| 5,343,776 A | 9/1994 | Falco |
| 5,374,059 A | 12/1994 | Huang |
| 5,396,727 A | 3/1995 | Furuya et al. |
| 5,427,376 A | 6/1995 | Cummings et al. |
| 5,469,601 A | 11/1995 | Jackson |
| 5,474,802 A | 12/1995 | Shimoda et al. |
| 5,480,146 A | 1/1996 | Comer |
| 5,485,996 A | 1/1996 | Niksich |
| 5,511,445 A | 4/1996 | Hildebrandt |
| 5,537,773 A | 7/1996 | Matsubara et al. |
| 5,570,884 A | 11/1996 | Carps |
| 5,571,050 A | 11/1996 | Huang |
| 5,577,722 A | 11/1996 | Glassberg |
| 5,584,482 A | 12/1996 | Huang |
| 5,595,544 A | 1/1997 | Roelke |
| 5,611,533 A | 3/1997 | Williams |
| 5,624,116 A | 4/1997 | Yeh |
| 5,626,527 A | 5/1997 | Eberlein |
| 5,634,859 A | 6/1997 | Nesbitt |
| 5,645,501 A | 7/1997 | Huang |
| 5,671,923 A | 9/1997 | Huang |
| 5,690,566 A | 11/1997 | Bracho |
| 5,695,418 A | 12/1997 | Huang |
| 5,730,662 A | 3/1998 | Rens |
| 5,730,669 A | 3/1998 | Huang |
| 5,753,568 A | 5/1998 | Shimano et al. |
| 5,772,524 A | 6/1998 | Huang |
| 5,781,963 A | 7/1998 | Maru et al. |
| 5,797,813 A | 8/1998 | Huang |
| 5,803,828 A | 9/1998 | Huang |
| 5,813,921 A | 9/1998 | Huang |
| 5,816,933 A | 10/1998 | Huang |
| 5,816,934 A | 10/1998 | Huang |
| 5,827,129 A | 10/1998 | Huang |
| 5,839,983 A | 11/1998 | Kramer |
| 5,851,632 A | 12/1998 | Chen et al. |
| 5,857,929 A | 1/1999 | Huang |
| 5,867,868 A | 2/1999 | Ward |
| 5,890,260 A | 4/1999 | Gaunt |
| 5,890,972 A | 4/1999 | Huang |
| 5,895,329 A | 4/1999 | Huang |
| 5,910,054 A | 6/1999 | Huang |
| 5,924,941 A | 7/1999 | Hagey |
| 5,997,421 A | 12/1999 | Huang |
| 6,036,607 A | 3/2000 | Finegan |
| 6,048,275 A | 4/2000 | Gedeon |
| 6,148,482 A | 11/2000 | Maraman, Jr. |
| 6,197,392 B1 | 3/2001 | Jones |
| 6,226,836 B1 | 5/2001 | Yasui |
| 6,244,975 B1 | 6/2001 | Huang |
| 6,261,191 B1 | 7/2001 | Chen |
| 6,314,617 B1 | 11/2001 | Hastings |
| 6,360,475 B1 | 3/2002 | Lepage et al. |
| 6,361,450 B1 | 3/2002 | Huang |
| 6,386,989 B1 | 5/2002 | Huang |
| D463,520 S | 9/2002 | Ulrich |
| 6,449,803 B1 | 9/2002 | McConchie |
| 6,503,153 B2 | 1/2003 | Wang |
| 6,506,128 B1 | 1/2003 | Bloom, Jr. |
| 6,511,732 B1 | 1/2003 | Chao |
| 6,551,198 B2 | 4/2003 | Huang |
| 6,558,270 B2 | 5/2003 | Kwitek |
| 6,627,027 B2 | 9/2003 | Huang |
| 6,629,382 B2 | 10/2003 | Irrgang et al. |
| 6,629,901 B2 | 10/2003 | Huang |
| 6,635,688 B2 | 10/2003 | Simpson |
| 6,652,398 B2 | 11/2003 | Falone et al. |
| 6,656,054 B2 | 12/2003 | Ulrich |
| 6,656,057 B2 | 12/2003 | Manual et al. |
| 6,663,500 B2 | 12/2003 | Huang |
| 6,666,777 B1 | 12/2003 | Lamkin et al. |
| 6,676,534 B2 | 1/2004 | Huang |
| 6,695,713 B2 | 2/2004 | Huang |
| 6,709,346 B1 | 3/2004 | Wang |
| 6,733,401 B1 | 5/2004 | Huang |
| 6,762,243 B2 | 7/2004 | Stender et al. |
| 6,827,656 B1 | 12/2004 | Hoeflich et al. |
| 6,843,732 B1 | 1/2005 | Huang |
| 6,857,971 B2 | 2/2005 | Huang |
| 6,908,400 B2 | 6/2005 | Chu et al. |
| 6,973,750 B1 | 12/2005 | Kim |
| 6,974,626 B2 | 12/2005 | Horacek |
| 7,008,582 B2 | 3/2006 | Chen |
| 7,025,690 B2 | 4/2006 | Nam |
| 7,048,644 B2 | 5/2006 | Wang |
| 7,137,904 B2 | 11/2006 | Huang |
| 7,140,973 B2 | 11/2006 | Rohrer |
| D534,602 S | 1/2007 | Norton et al. |
| D534,603 S | 1/2007 | Norton et al. |
| D534,604 S | 1/2007 | Norton et al. |
| D534,605 S | 1/2007 | Norton et al. |
| D534,607 S | 1/2007 | Norton et al. |
| D534,975 S | 1/2007 | Norton et al. |
| D536,048 S | 1/2007 | Chen |
| D538,868 S | 3/2007 | Norton et al. |
| D538,869 S | 3/2007 | Wang et al. |
| 7,186,189 B2 | 3/2007 | Huang |
| 7,195,568 B2 | 3/2007 | Huang |
| 7,219,395 B2 | 5/2007 | Bigolin |

| | | |
|---|---|---|
| 7,344,447 B2 | 3/2008 | Chang |
| 7,344,448 B2 | 3/2008 | Huang |
| 7,347,792 B2 | 3/2008 | Huang |
| 7,374,498 B2 | 5/2008 | Huang |
| 7,404,770 B2 | 7/2008 | Huang |
| 7,438,646 B2 | 10/2008 | Huang |
| 7,448,957 B2 | 11/2008 | Huang |
| 7,448,958 B2 | 11/2008 | Huang |
| 7,458,903 B2 | 12/2008 | Wang et al. |
| 7,470,199 B2 | 12/2008 | Huang |
| 7,491,133 B2 | 2/2009 | Huang |
| 7,527,564 B2 | 5/2009 | Huang |
| 7,566,375 B2 | 7/2009 | Huang |
| 7,585,230 B2 | 9/2009 | Huang |
| 7,770,321 B2 | 8/2010 | Huang |
| 2001/0046905 A1 | 11/2001 | Huang |
| 2002/0028325 A1 | 3/2002 | Simpson |
| 2002/0142858 A1 | 10/2002 | Chen |
| 2002/0142900 A1 | 10/2002 | Wang |
| 2002/0151373 A1 | 10/2002 | Beauregard |
| 2002/0173371 A1 | 11/2002 | Lamkin et al. |
| 2003/0040384 A1 | 2/2003 | Falone et al. |
| 2003/0045370 A1 | 3/2003 | Jaw |
| 2003/0062654 A1 | 4/2003 | Lamkin |
| 2003/0139223 A1 | 7/2003 | Ulrich et al. |
| 2003/0148836 A1 | 8/2003 | Falone et al. |
| 2003/0150081 A1 | 8/2003 | Wang |
| 2003/0216192 A1 | 11/2003 | Chu |
| 2003/0228930 A1 | 12/2003 | Huang |
| 2004/0029645 A1 | 2/2004 | Chen |
| 2004/0029646 A1 | 2/2004 | Chu et al. |
| 2004/0031128 A1 | 2/2004 | Chen |
| 2004/0109980 A1 | 6/2004 | Chen et al. |
| 2004/0123429 A1 | 7/2004 | Wang |
| 2004/0185958 A1 | 9/2004 | Huang |
| 2004/0248664 A1 | 12/2004 | Billings |
| 2005/0123723 A1 | 6/2005 | Wang |
| 2005/0229285 A1 | 10/2005 | Chung |
| 2005/0276925 A1 | 12/2005 | Su |
| 2005/0287329 A1 | 12/2005 | Lai |
| 2006/0172815 A1 | 8/2006 | Chu |
| 2006/0252571 A1 | 11/2006 | Wang |
| 2006/0287123 A1 | 12/2006 | Wang |
| 2007/0149307 A1 | 6/2007 | Huang |
| 2008/0039226 A1 | 2/2008 | Chi |
| 2008/0120893 A1 | 5/2008 | Keys et al. |
| 2008/0172839 A1 | 7/2008 | Wang |
| 2010/0281754 A1 | 11/2010 | Huang |

FOREIGN PATENT DOCUMENTS

| | | |
|---|---|---|
| CN | 2163667 Y | 5/1994 |
| CN | 2288744 | 8/1998 |
| CN | 1332022 A | 7/2000 |
| CN | 2438768 | 7/2001 |
| CN | 2444645 | 8/2001 |
| CN | ZL 2090283 | 9/2002 |
| CN | 2596752 Y | 1/2004 |
| CN | 2659497 Y | 12/2004 |
| DE | 36 44 674 A1 | 7/1988 |
| DE | 92 18 550 U1 | 8/1994 |
| FR | 2 731 402 A3 | 9/1996 |
| GB | 2 192 550 A | 1/1988 |
| JP | 53-12061 | 2/1978 |
| JP | 55-43008 | 3/1980 |
| JP | 60-61067 | 4/1985 |
| JP | 3112575 | 5/1991 |
| JP | 7-41731 | 2/1995 |
| JP | 3076015 | 12/2000 |
| JP | 3081404 | 8/2001 |
| JP | 2002-028264 | 1/2002 |
| JP | 2005-130767 | 5/2005 |

OTHER PUBLICATIONS

The Random House College Dictionary, Revised Edition, 1975, p. 1233, definition of skive.

U.S. Appl. No. 10/167,216, filed Jun. 11, 2002, now U.S. Patent No. 7,137,904, issued Nov. 21, 2006.

U.S. Appl. No. 10/348,389, filed Jan. 21, 2003, now U.S. Patent No. 6,733,401, issued May 11, 2004.

U.S. Appl. No. 10/392,480, filed Mar. 18, 2003, now U.S. Patent No. 6,857,971, issued Feb. 22, 2005.

U.S. Appl. No. 10/746,764, filed Dec. 23, 2003, now U.S. Patent No. 6,843,732, issued Jan. 18, 2005.

U.S. Appl. No. 10/608,598, filed Jun. 27, 2003, (U.S. Pub. No. 2004-0266546 A1), abandoned.

U.S. Appl. No. 10/785,379, filed Feb. 24, 2004, now U.S. Patent No. 7,374,498, issued May 20, 2008.

U.S. Appl. No. 10/827,095, filed Apr. 19, 2004, now U.S. Patent No. 7,195,568, issued Mar. 27, 2007.

U.S. Appl. No. 10/875,035, filed Jun. 23, 2004, now U.S. Patent No. 7,585,230, issued Sep. 8, 2009.

U.S. Appl. No. 11/029,328, filed Jan. 5, 2005, (U.S. Pub. No. 2005-0148401 A1), abandoned.

U.S. Appl. No. 11/062,046, filed Feb. 18, 2005, now U.S. Patent No. 7,470,199, issued Dec. 30, 2008.

U.S. Appl. No. 11/131,832, filed May 18, 2005, now U.S. Patent No. 7,527,564, issued May 5, 2009.

U.S. Appl. No. 11/172,770, filed Jul. 1, 2005, now U.S. Patent No. 7,186,189, issued Mar. 6, 2007.

U.S. Appl. No. 11/412,196, filed Apr. 25, 2006, (U.S. Pub. No. 2006-0264268 A1), abandoned.

U.S. Appl. No. 11/416,364, filed May 1, 2006, now U.S. Patent No. 7,438,646, issued Oct. 21, 2008.

U.S. Appl. No. 12/425,187, filed Apr. 16, 2009, (U.S. Pub. No. 2009-0258722 A1), abandoned.

U.S. Appl. No. 11/413,411, filed Apr. 28, 2006, now U.S. Patent No. 7,344,448, issued Mar. 18, 2008.

U.S. Appl. No. 11/438,808, filed May 22, 2006, now U.S. Patent No. 7,347,792, issued Mar. 25, 2008.

U.S. Appl. No. 11/417,643, filed May 3, 2006, now U.S. Patent No. 7,448,957, issued Nov. 11, 2008.

U.S. Appl. No. 11/417,623, filed May 3, 2006, now U.S. Patent No. 7,566,375, issued Jul. 28, 2009.

U.S. Appl. No. 11/417,555, filed May 3, 2006, now U.S. Patent No. 7,404,770, issued Jul. 29, 2008.

U.S. Appl. No. 11/417,401, filed May 3, 2006, now U.S. Patent No. 7,491,133, issued Feb. 17, 2009.

U.S. Appl. No. 11/682,264, filed Mar. 5, 2007, now U.S. Patent No. 7,980,961, issued Jul. 19, 2011.

U.S. Appl. No. 11/417,696, filed Mar. 5, 2006, now U.S. Patent No. 7,448,958, issued Nov. 11, 2008.

U.S. Appl. No. 12/045,639, filed Mar. 10, 2008, now U.S. Patent No. 7,770,321, issued Aug. 10, 2010.

U.S. Appl. No. 11/689,452, filed Mar. 21, 2007, now U.S. Patent No. 7,862,445, issued Jan. 4, 2011.

U.S. Appl. No. 12/123,384, filed May 19, 2008, now U.S. Patent No. 7,985,314, issued Jul. 26, 2011.

U.S. Appl. No. 11/838,670, filed Aug. 14, 2007, now U.S. Patent No. 7,862,446, issued Jan. 4, 2011.

U.S. Appl. No. 12/055,289, filed Mar. 25, 2008, now U.S. Patent No. 8,003,171, issued Aug. 23, 2011.

U.S. Appl. No. 12/426,896, filed Apr. 20, 2009, (U.S. Pub. No. 2009-0258721 A1), abandoned.

U.S. Appl. No. 12/753,804, filed Apr. 2, 2010, (U.S. Pub. 2010-0269626 A1), pending.

U.S. Appl. No. 12/753,669, filed Apr. 2, 2010, (U.S. Pub. 2010-0260987 A1), pending.

U.S. Appl. No. 12/753,799, filed Apr. 2, 2010, (U.S. Pub. 2010-0273568 A1), pending.

U.S. Appl. No. 12/753,773, filed Apr. 2, 2010, (U.S. Pub. 2010-0281754 A1), pending.

U.S. Appl. No. 12/767,736, filed Apr. 26, 2010, (U.S. Pub. 2011-0065524 A1), pending.

U.S. Appl. No. 12/511,033, filed Jul. 28, 2009, (U.S. Pub. No. 2010-0022322 A1), pending.

U.S. Appl. No. 12/848,052, filed Jul. 30, 2010, (U.S. Pub. 2011-0258904 A1), pending.

U.S. Appl. No. 12/862,673, filed Aug. 24, 2010, (U.S. Pub. 2011-0053704 A1), pending.
U.S. Appl. No. 12/948,637, filed Nov. 17, 2010, (U.S. Pub. 2011-0113673 A1), pending.
U.S. Appl. No. 12/960,261, filed Dec. 3, 2010, now U.S. Patent No. 8,123,627, issued Feb. 28, 2012.
U.S. Appl. No. 13/208,297, filed Aug. 11, 2011, (U.S. Pub. 2011-0293902 A1), pending.
U.S. Appl. No. 13/403,764, filed Feb. 23, 2012, pending.
U.S. Appl. No. 29/416,672, filed Mar. 26, 2012, pending.
U.S. Appl. No. 29/436,610, filed Nov. 7, 2012, pending.

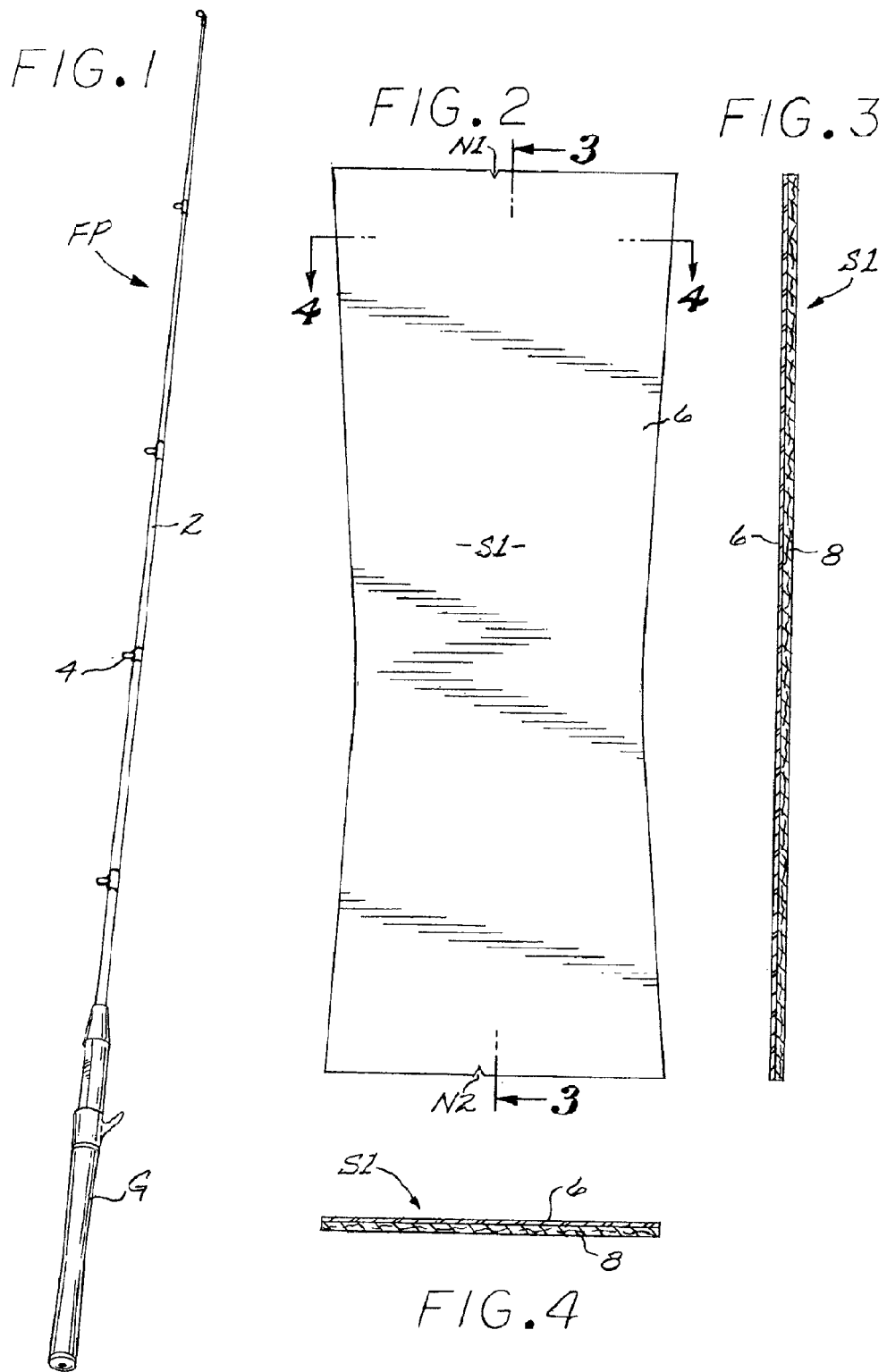

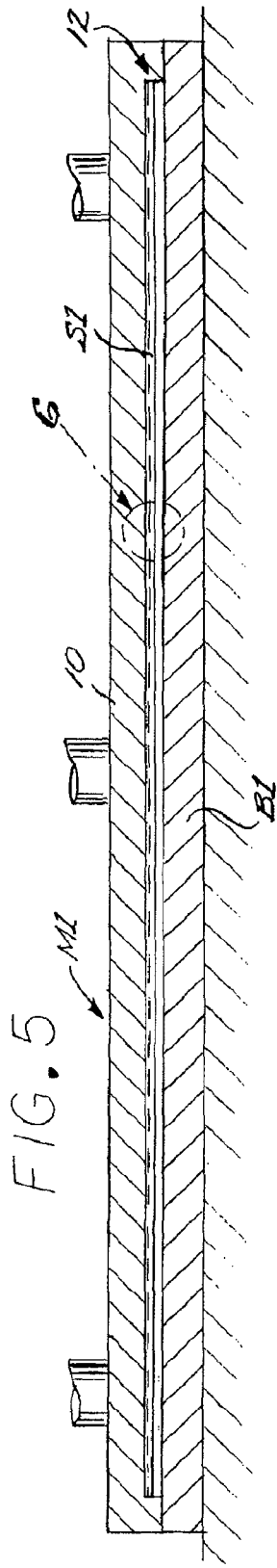
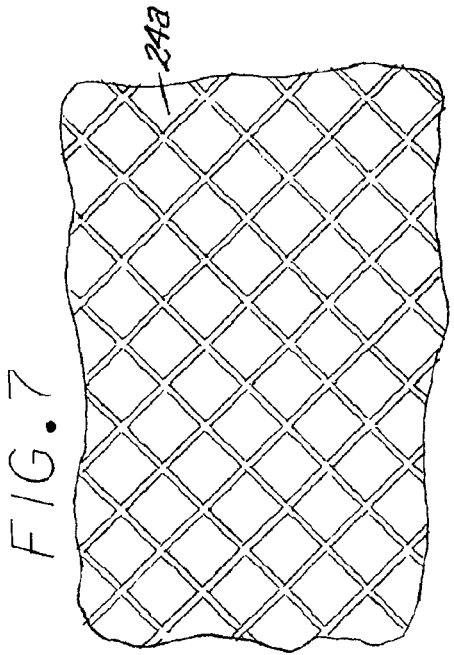
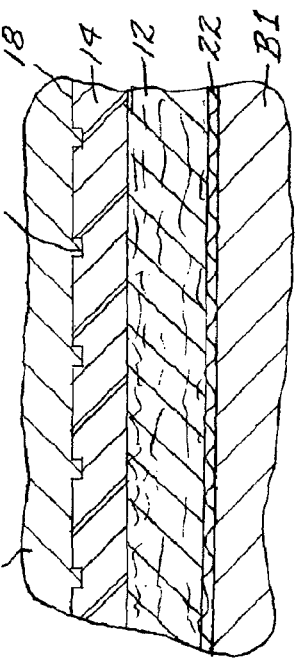
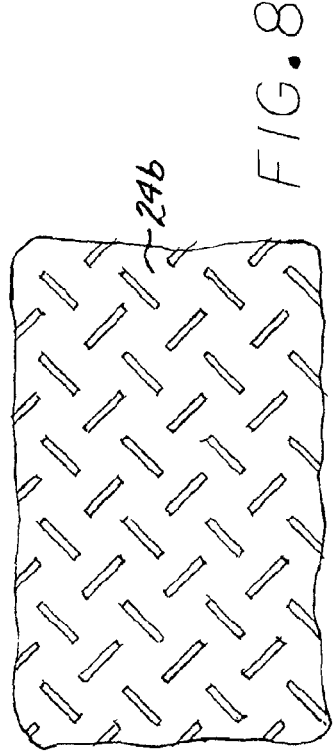

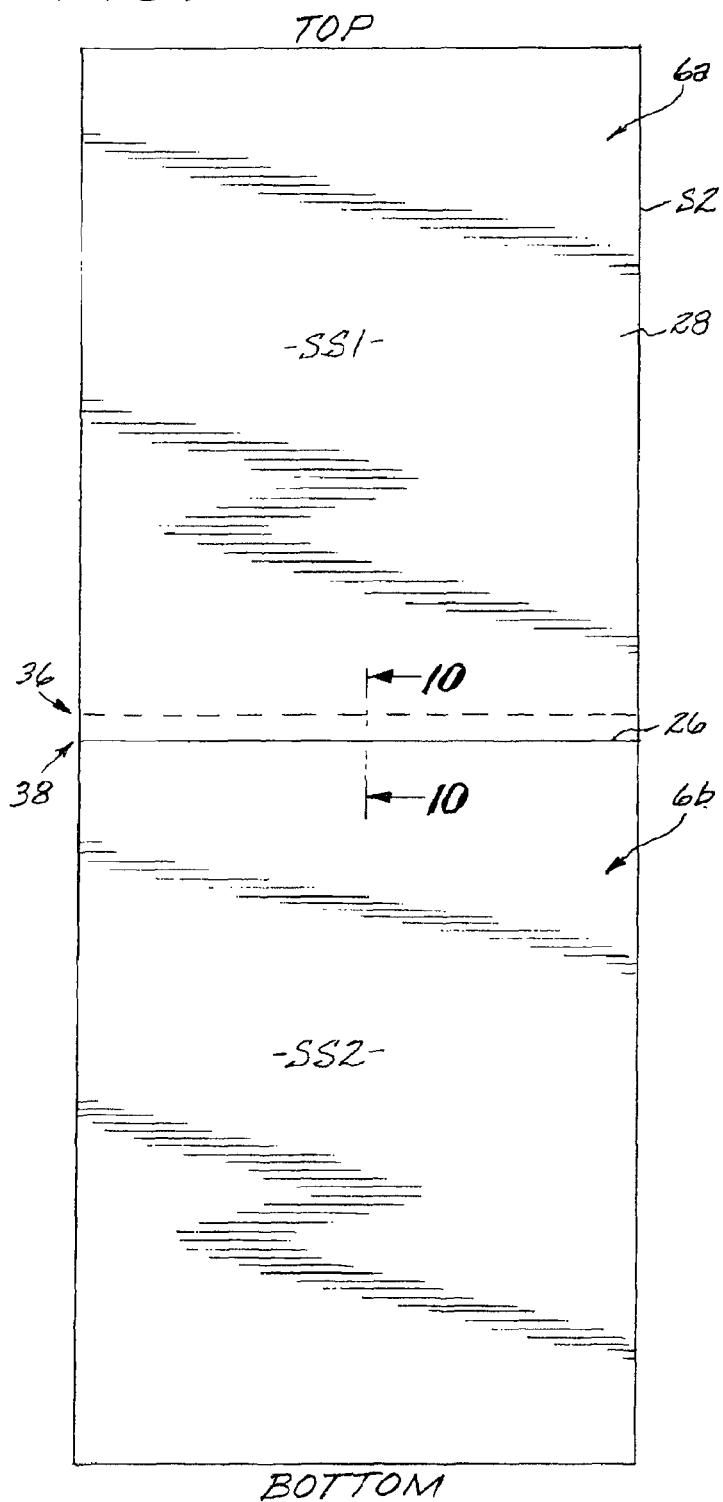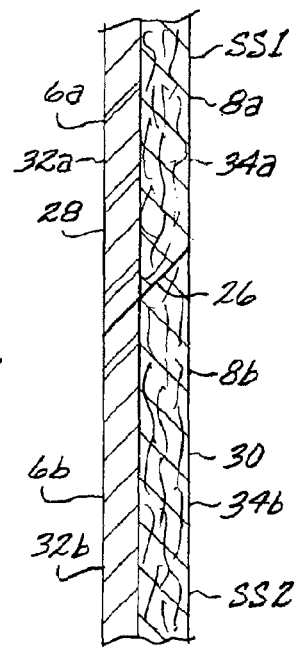

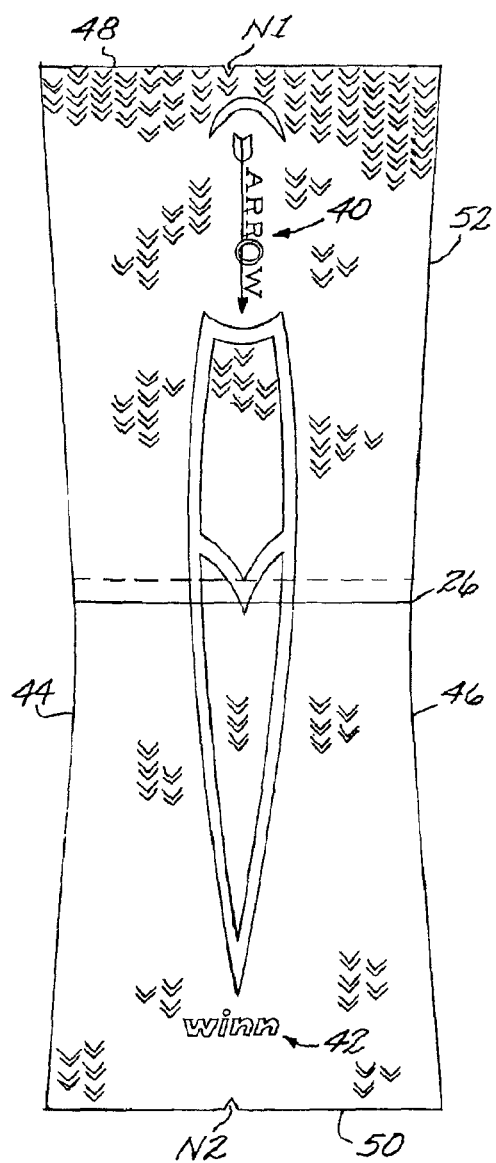
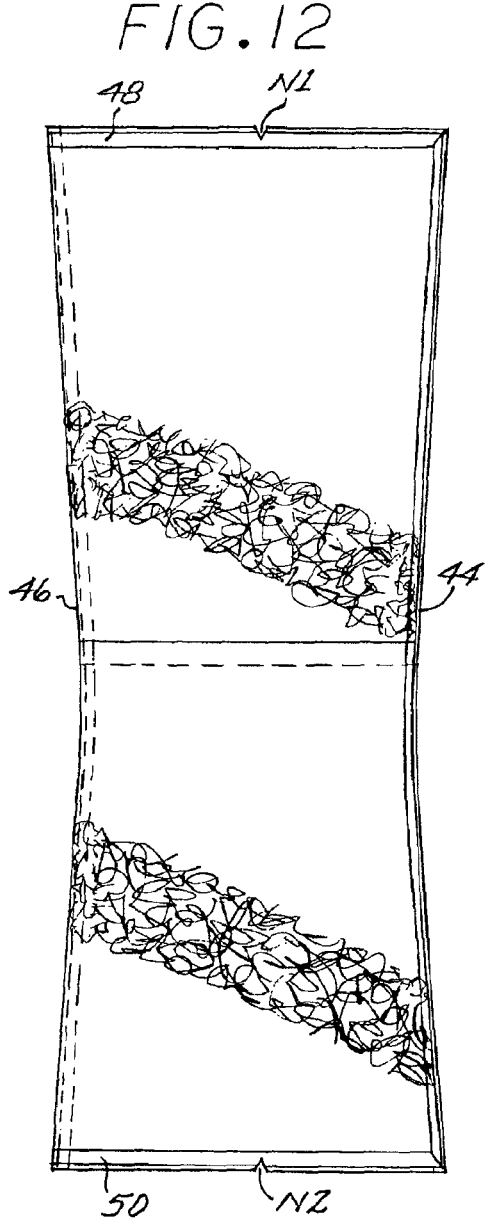

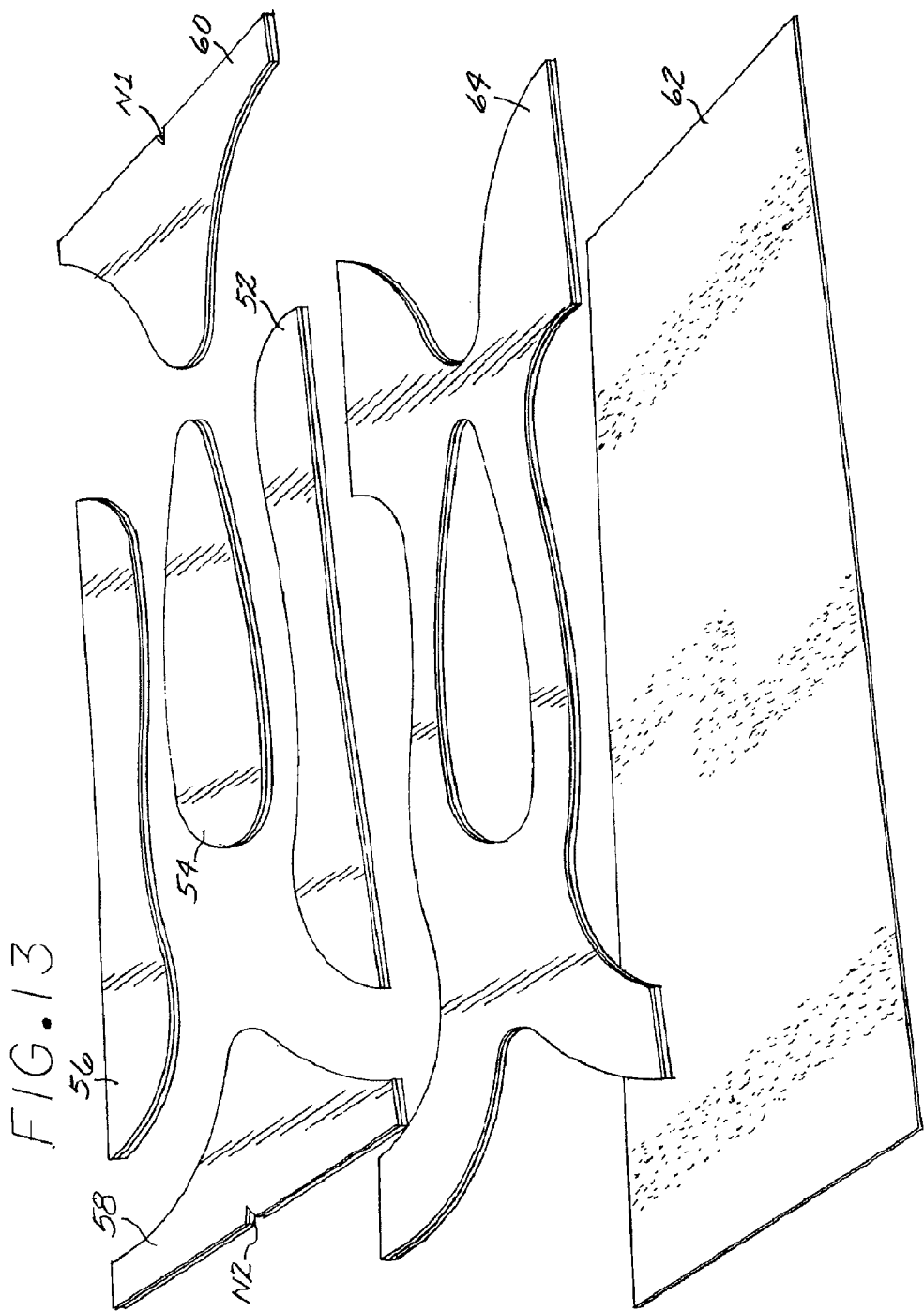

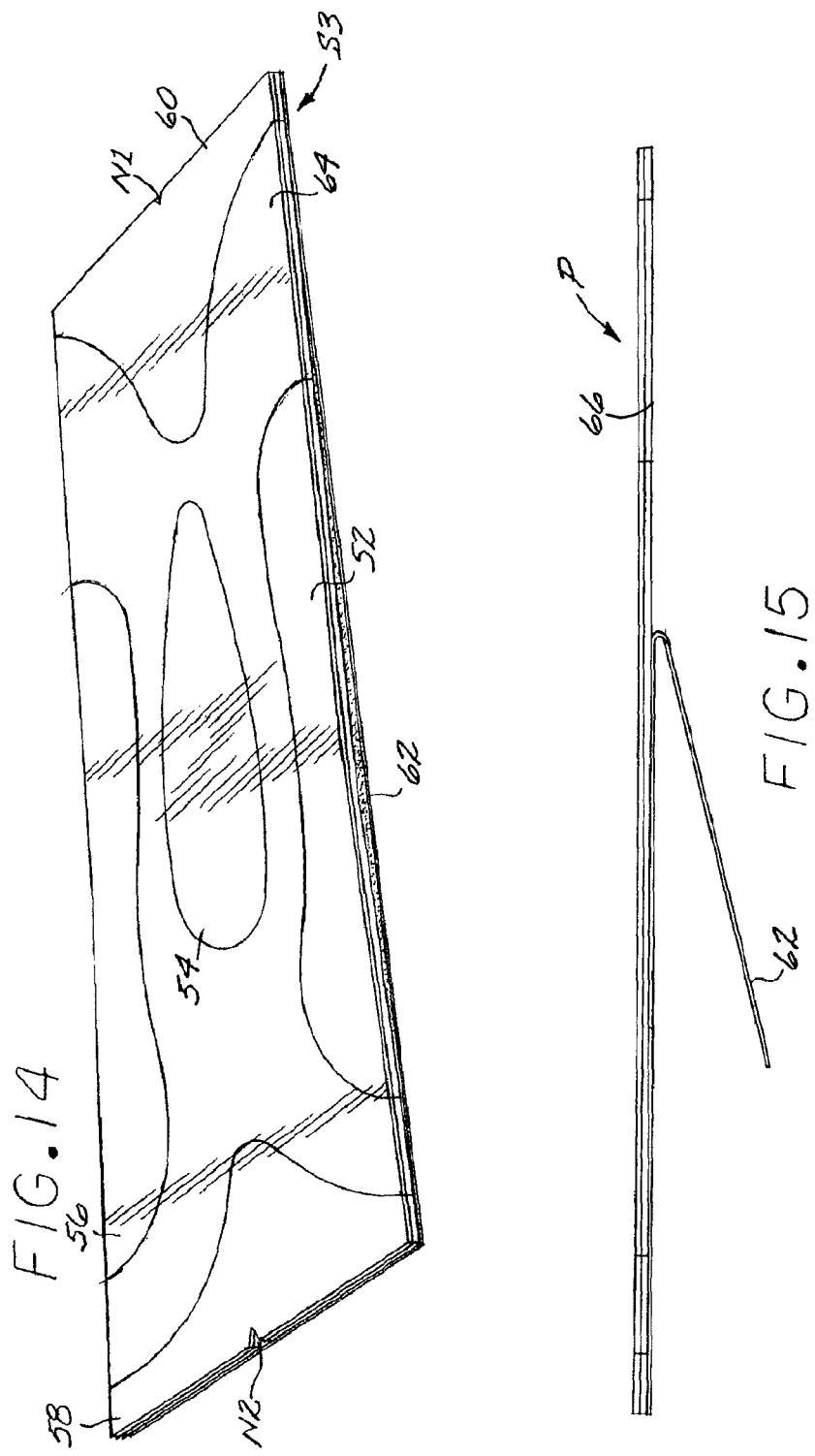

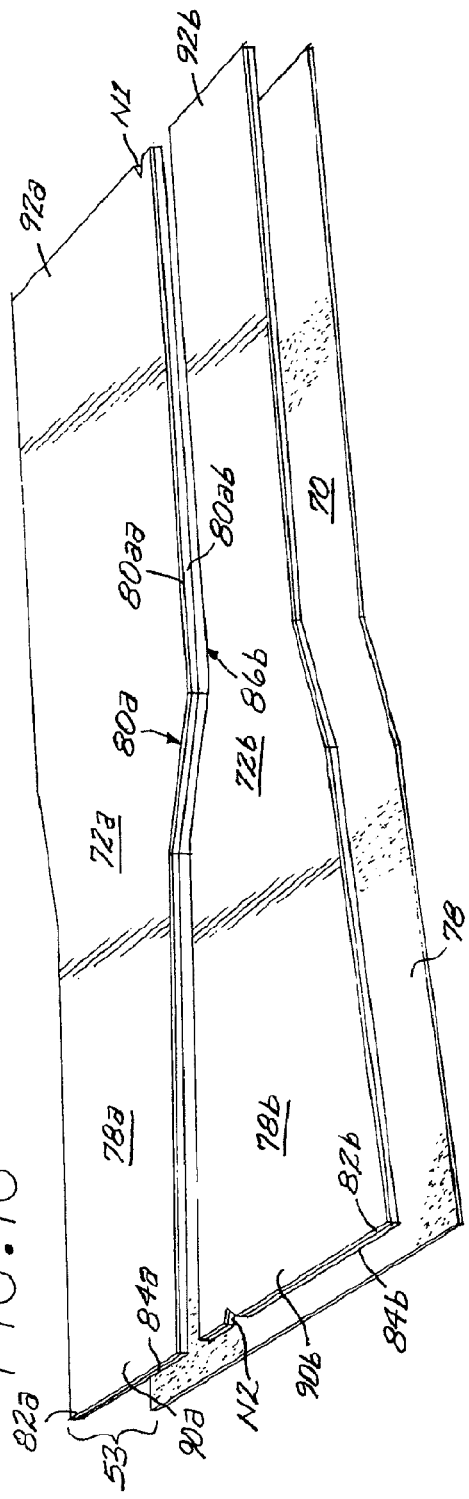

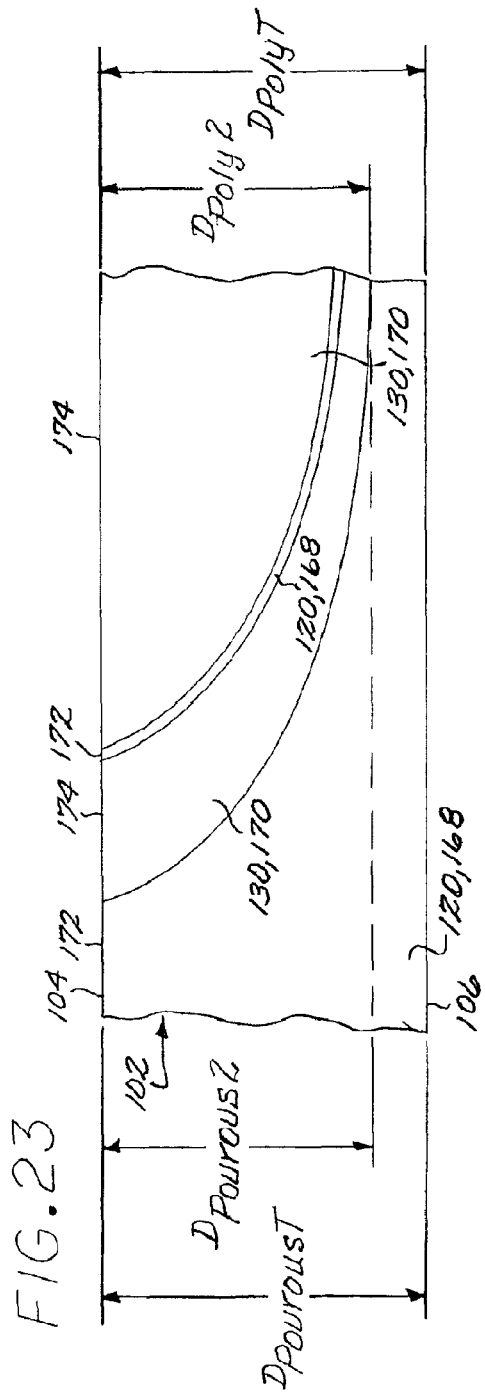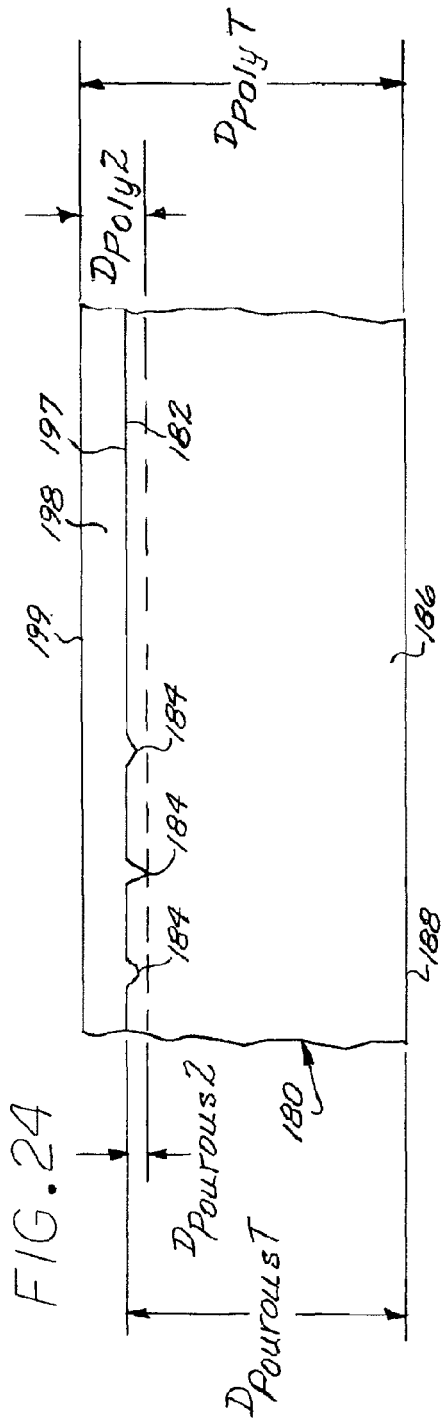

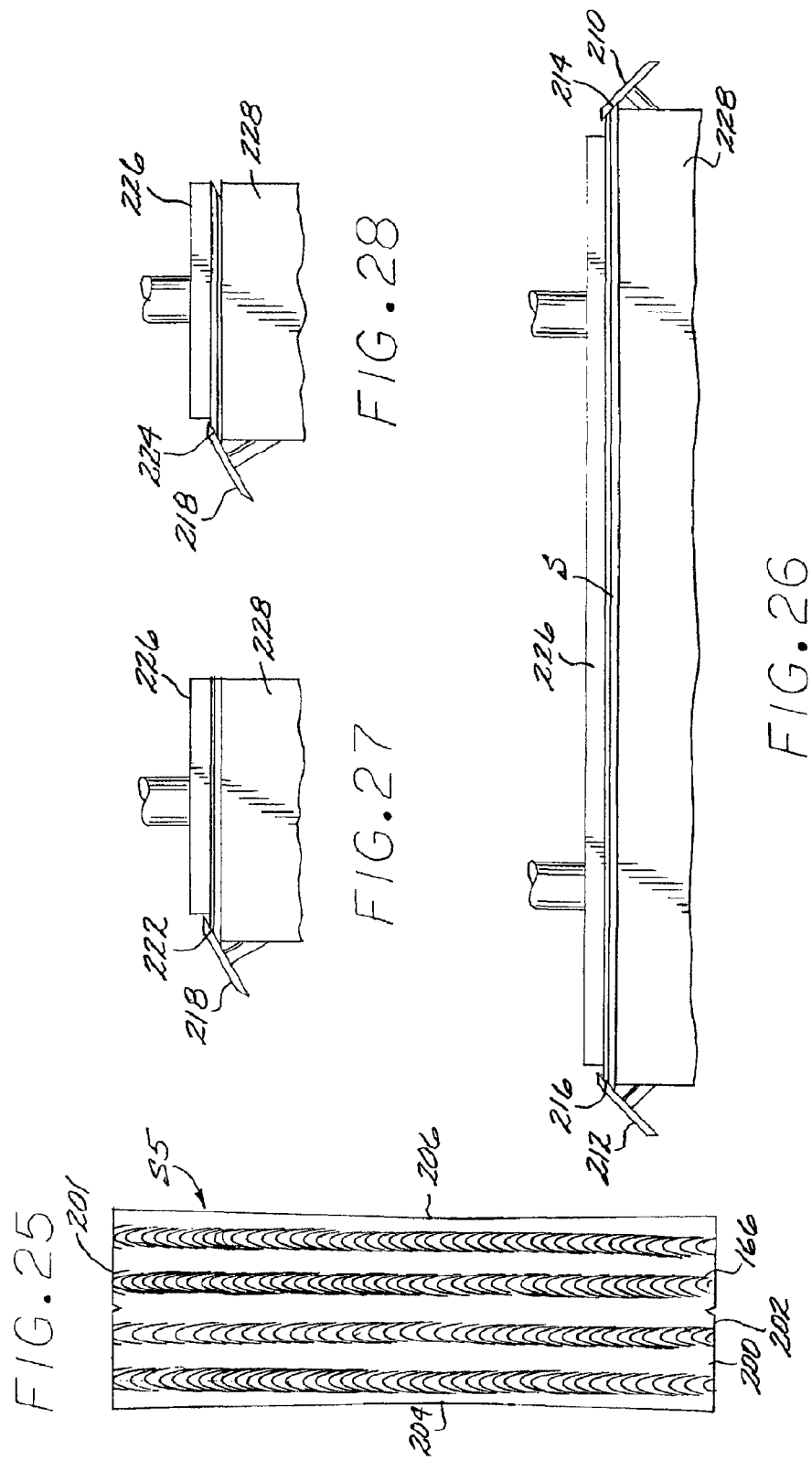

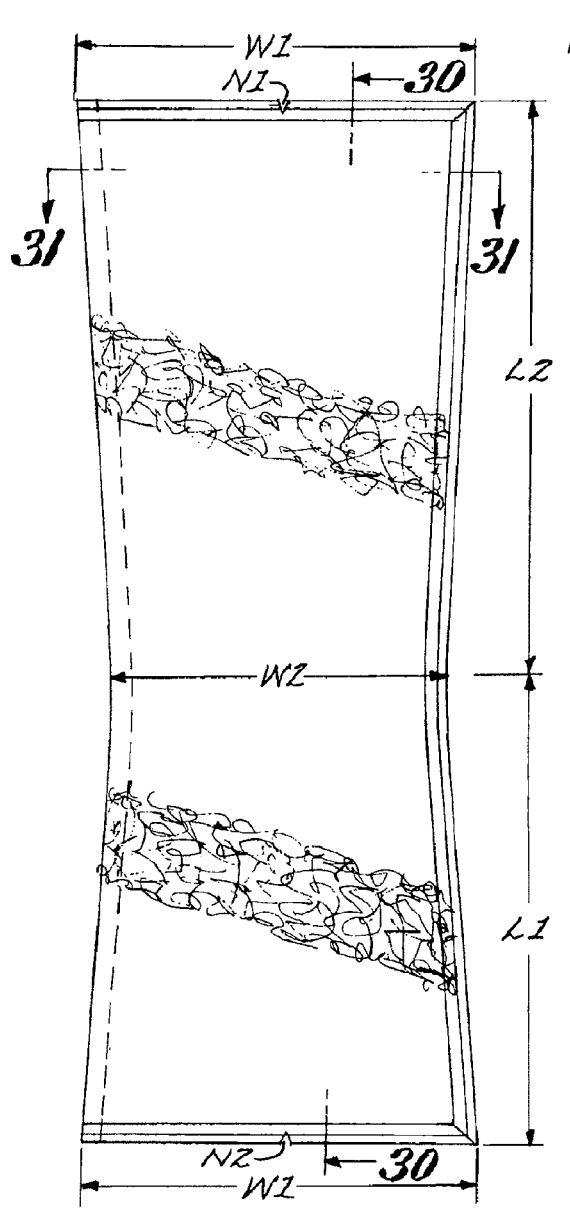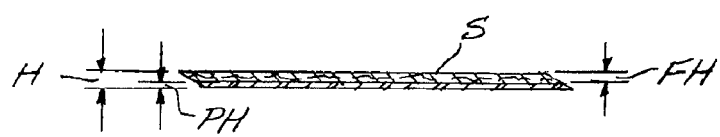

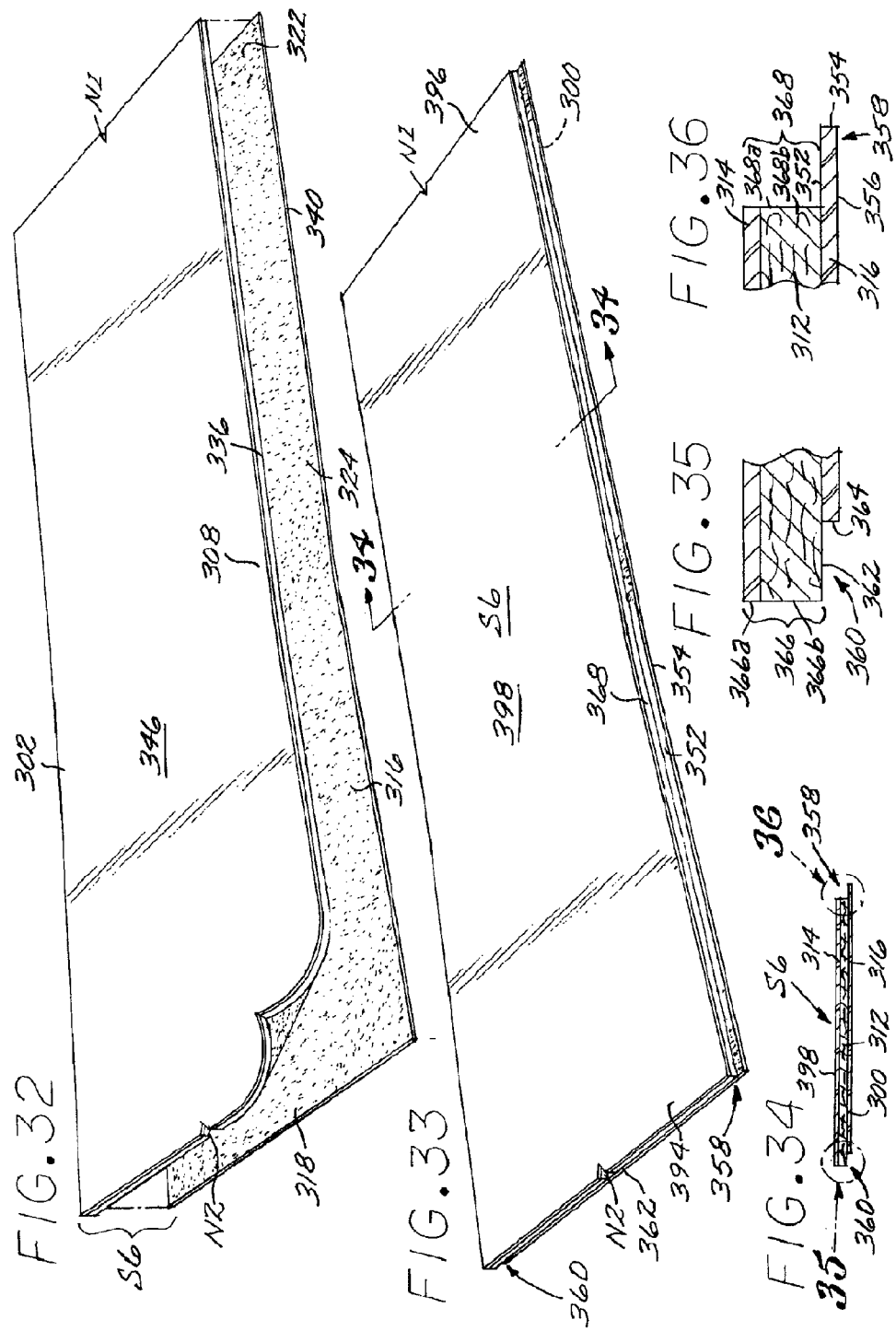

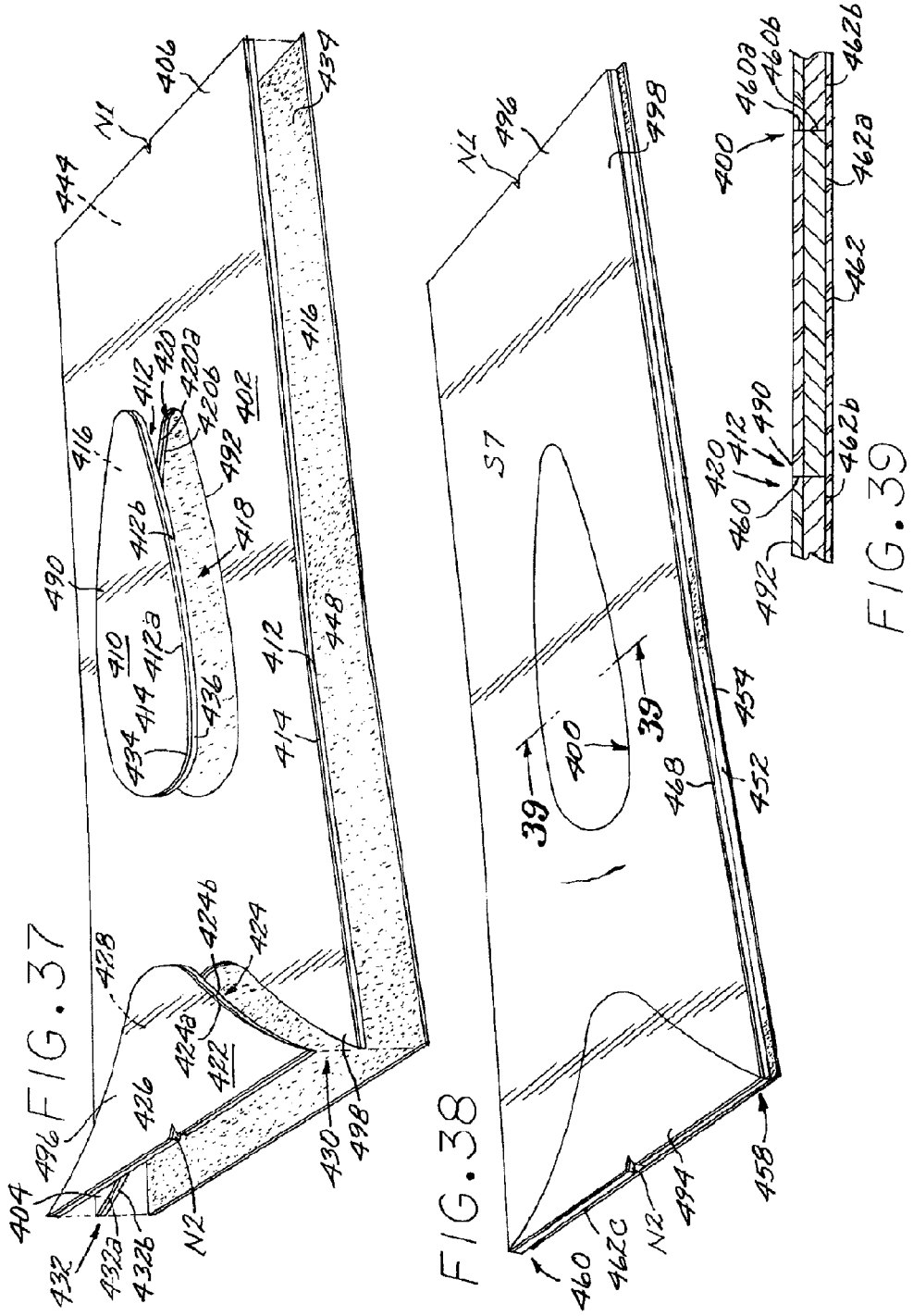

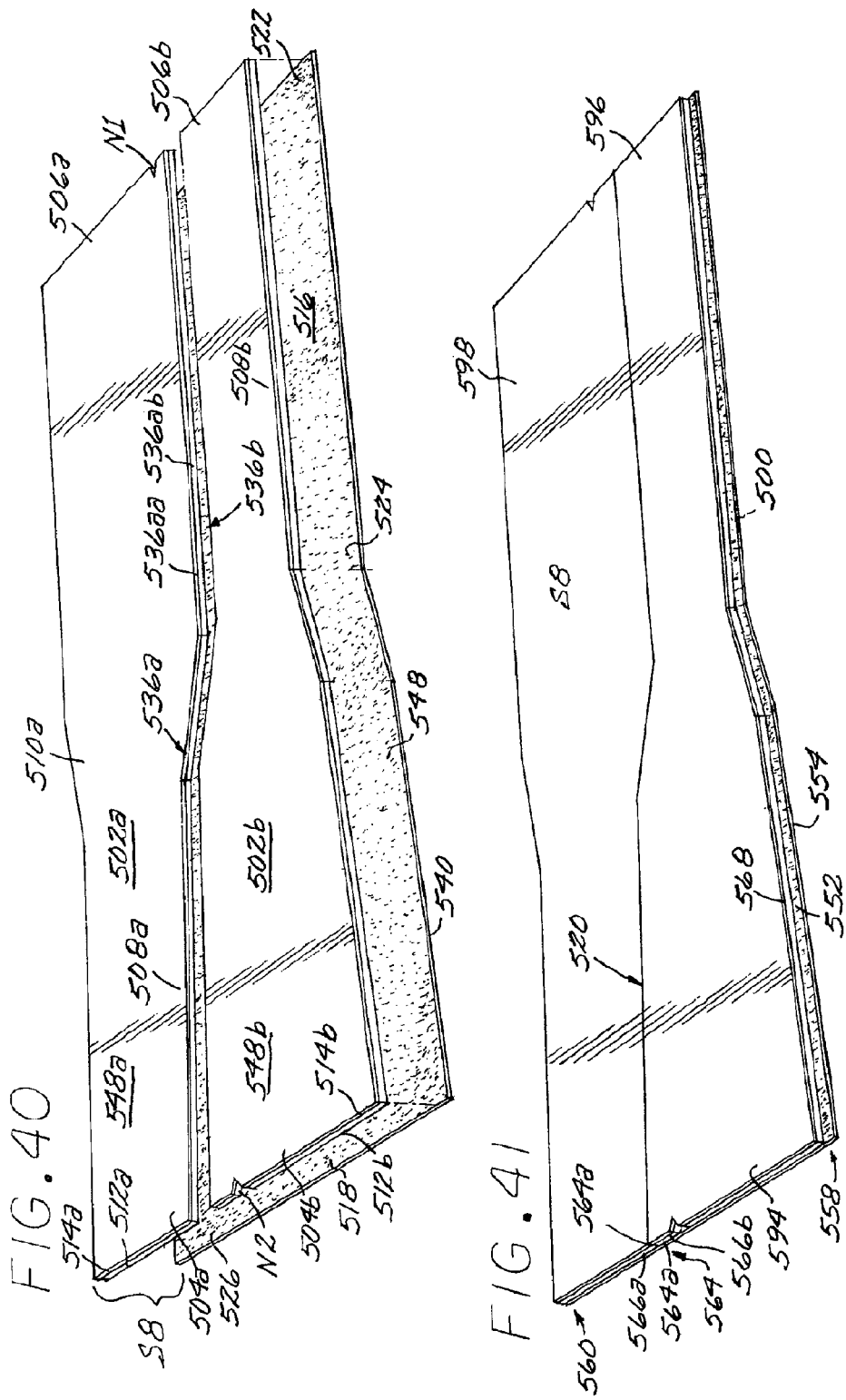

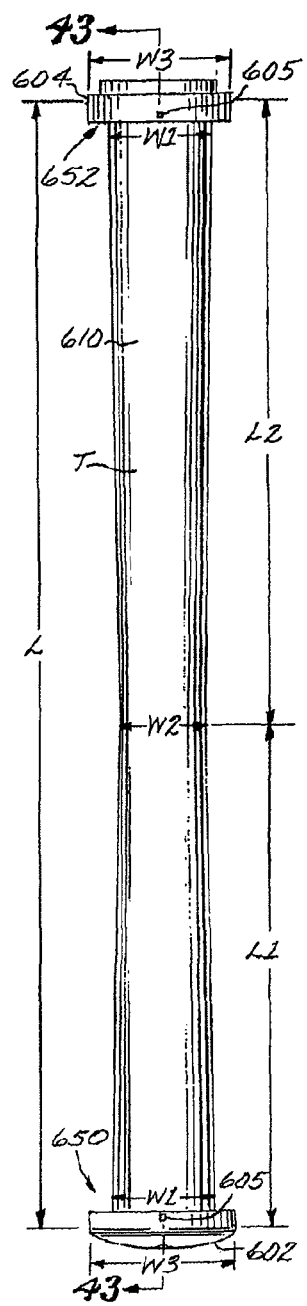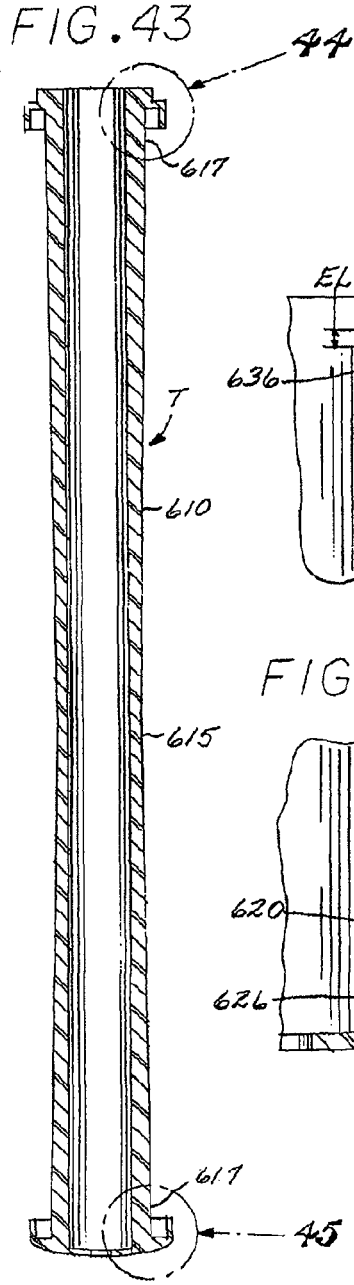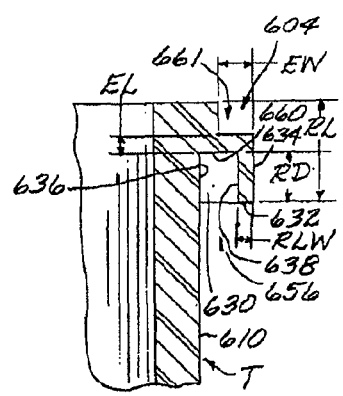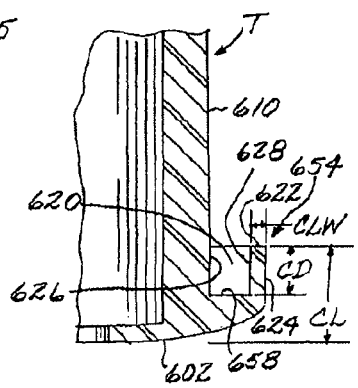

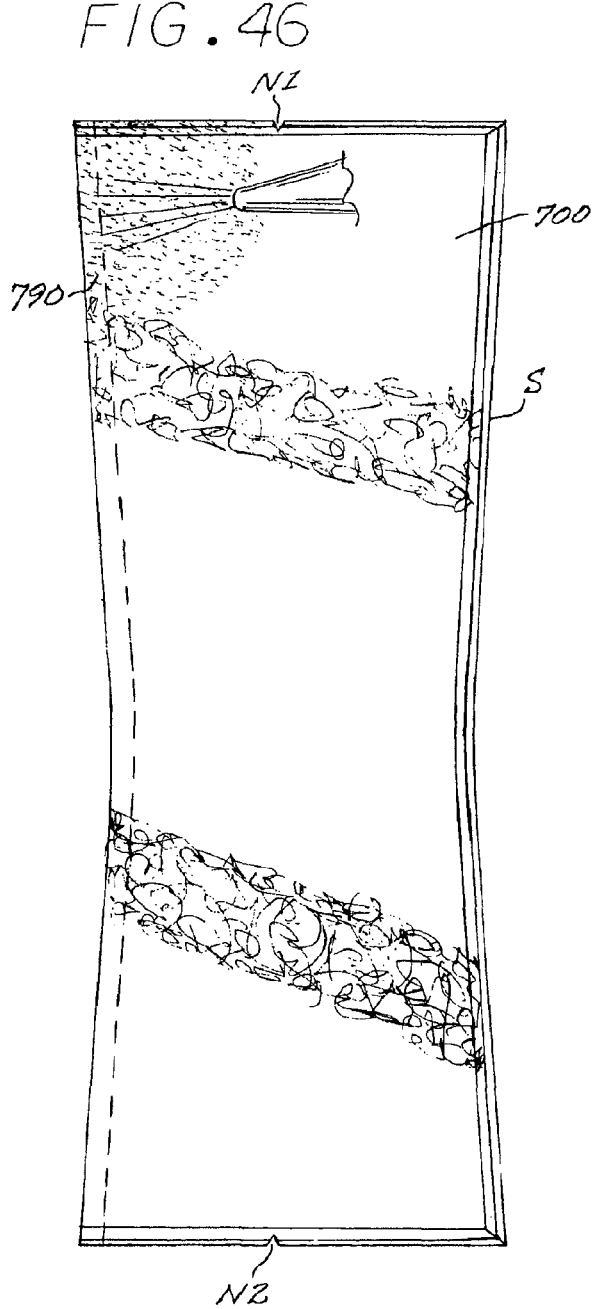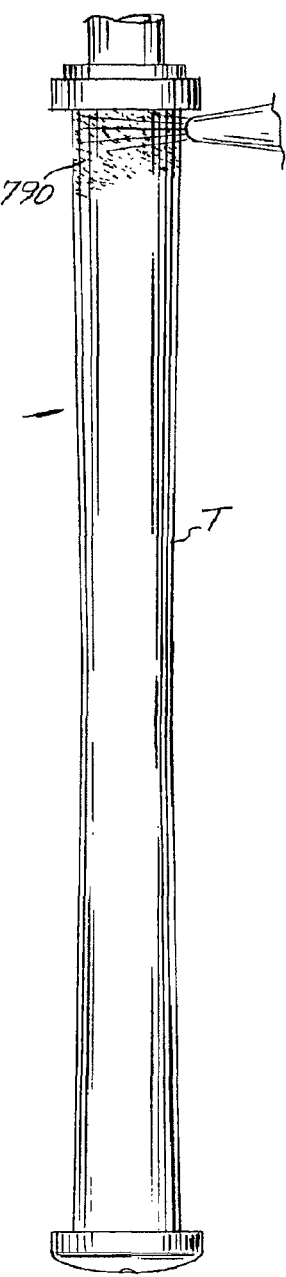

FIG. 48
FIG. 49
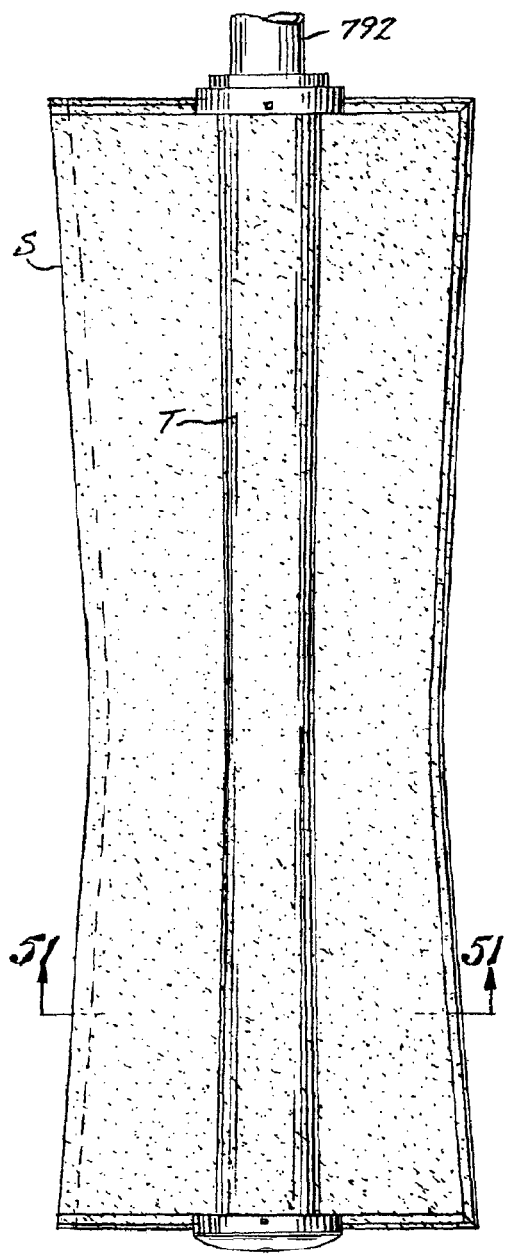
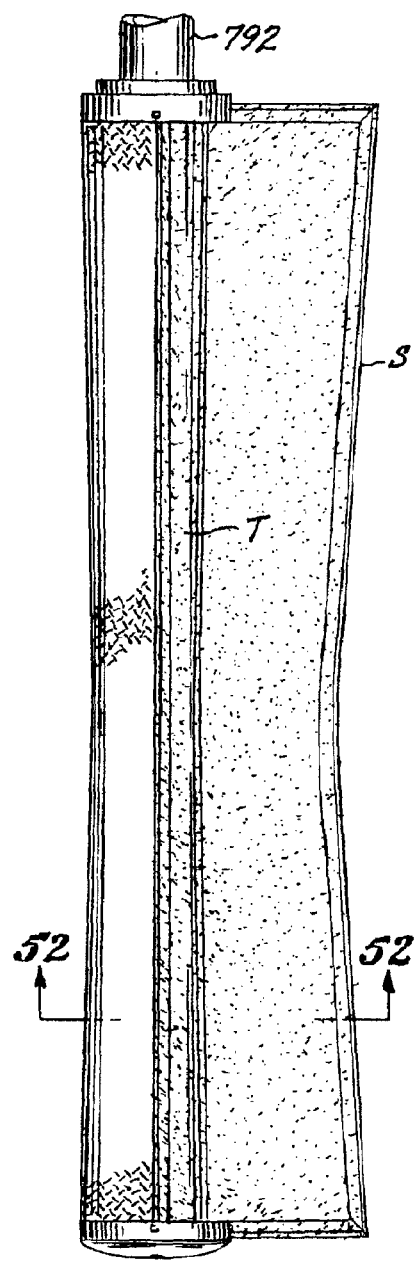

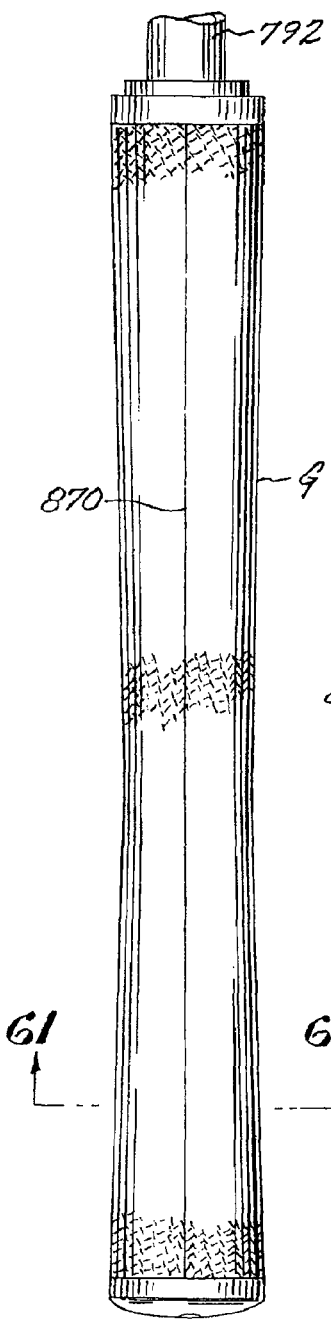
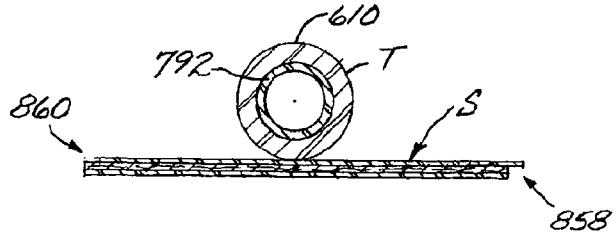
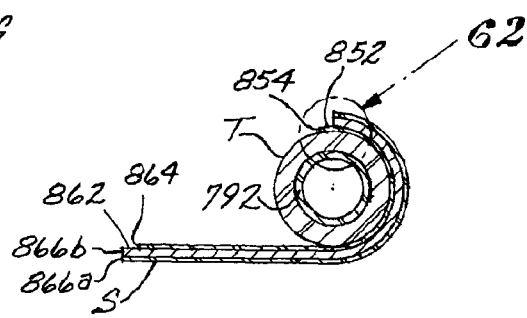
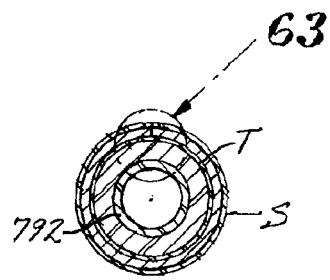
FIG.58
FIG.59
FIG.60
FIG.61

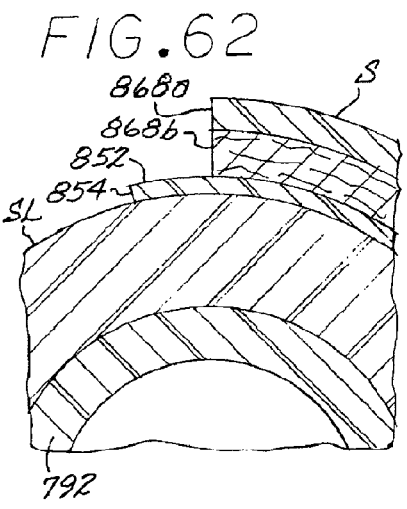
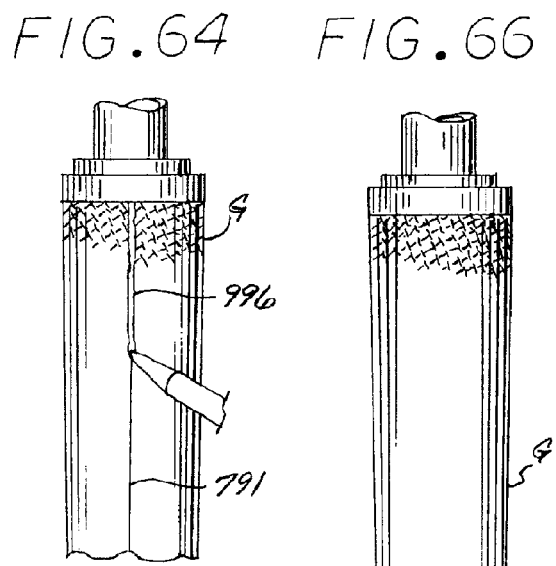
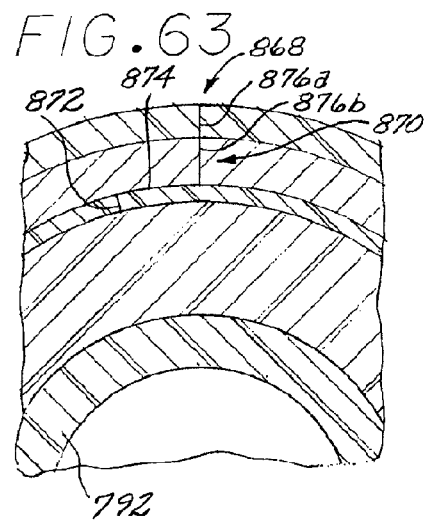
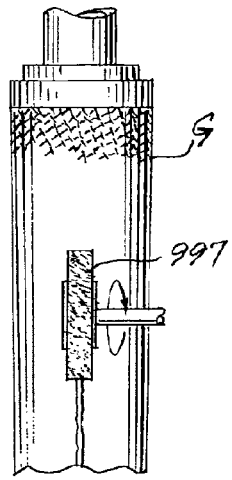

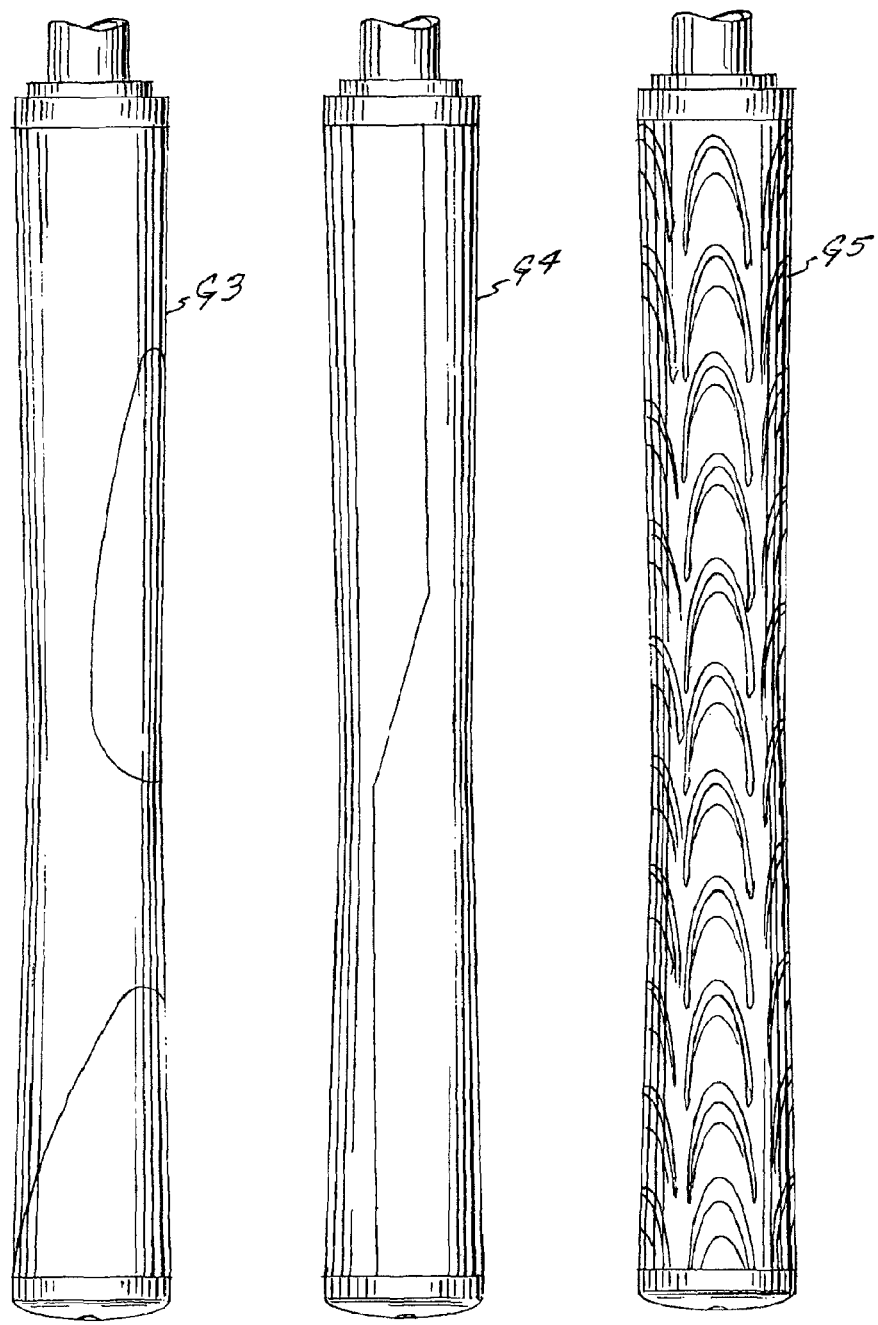

FISHING POLE GRIP

CROSS-REFERENCE TO RELATED APPLICATIONS

This application is a continuation of U.S. patent application Ser. No. 12/848,052, filed Jul. 30, 2010 (entitled "FISHING POLE GRIP"), pending, which is a continuation of U.S. patent application Ser. No. 12/045,639, filed Mar. 10, 2008 (entitled "FISHING POLE GRIP"), now U.S. Pat. No. 7,770,321, which claims the benefit of U.S. Provisional Patent Application No. 60/895,668, filed Mar. 19, 2007 (entitled "FISHING POLE GRIP"), the disclosures of each being hereby incorporated by reference in their entireties.

BACKGROUND OF THE INVENTION

1. Field of the Invention

This application relates to an improved grip for fishing poles.

2. Description of the Related Art

A large variety of fishing poles are employed in the diverse sport of fishing. Different types of rods may be used, for example, in bait fishing, fly-fishing, ice fishing, and surf fishing. For instance, fly-fishing rods are typically long, thin, and flexible to enable casting a lightweight fly. Fly-fishing rods also typically include only a small portion of handle extending below a reel. In contrast, surf rods used for ocean fishing are much thicker to facilitate casting heavy lures or baits beyond the surf. Surf rods include a long handle to enable two-handed casting. In addition to the extremes of fly-fishing and surf fishing rods, many other rod lengths and thicknesses are employed.

Typical fishing pole grips, such as used on Fenwick Eagle GT™ spinning rods, are cylindrical through substantially their entire length. Some grips, however, such as Shakespeare's Ugly Tuff™ "I" grip may also include a slight curvature. However, most modern grips have retained a historical cylindrical design. In addition, many grips are made of cork, as cork is light, durable, and transmits rod vibrations fairly well. However, cork is also a fairly hard material, which may be uncomfortable to hold during a long fishing trip. EVA and PVC foams are consequently used in place of cork, but grips incorporating these foams also tend to be stiff and uncomfortable to hold for long periods of time.

The stiffness and shape of currently available grips can cause strain on the hands and arms. This is particularly evident as fishers often hold a fishing pole for a long period of time. In some instances, such as in deep sea fishing, fishers may hold the rod for several minutes or even hours. In addition, fighting a fish can also cause strain. Some fish, such as sharks, are heavy and fight long and vigorously. Moreover, people fish in many different environments that may contribute to further strain. Ice fishers, for example, fish in frigid temperatures that may cause already stiff grips to feel even stiffer.

SUMMARY OF THE INVENTION

In various embodiments, a fishing pole includes a rod having a proximal end and a distal end, where the proximal end receives a grip and the distal end includes at least one line guide for receiving a fishing line. The grip of certain embodiments includes a flexible mounting tube that engages the proximal end of the rod and a sheet including a polymer outside layer and a fibrous inside layer. In one embodiment, the sheet has a configuration corresponding to the exterior shape of the flexible mounting tube, being wrapped about and adhered to the mounting tube, with the side edges of the sheet abutting one another to define a longitudinal seam extending from the interior surface of the sheet to the exterior surface of the polymer layer.

Various implementations of a grip for a fishing pole include a flexible mounting tube configured to engage an end of a rod and a sheet that includes a polymer outside layer and a fibrous inside layer. The sheet of certain embodiments has a configuration corresponding to the exterior shape of the flexible mounting tube, being wrapped about and adhered to the mounting tube, with the side edges of the sheet abutting one another to define a longitudinal seam extending from the interior surface of the sheet to the exterior surface of the polymer layer.

BRIEF DESCRIPTION OF THE DRAWINGS

FIG. 1 is a perspective view of a fishing pole incorporating a grip according to certain embodiments;

FIG. 2 is a side view of an embodiment of a single layered sheet member of a fishing pole grip;

FIG. 3 is a vertical sectional view taken along line 2-2 of FIG. 2;

FIG. 4 is a horizontal sectional view taken along line 3-3 of FIG. 2;

FIG. 5 is a horizontal cross-sectional view showing a mold which may be utilized in forming a sheet member of a sheet grip according to one embodiment;

FIG. 6 is an enlarged view of the encircled area designated 6 in FIG. 5;

FIG. 7 is an enlarged view of a pattern that may be formed by the mold shown in FIGS. 5 and 6;

FIG. 8 is an enlarged view of another pattern that may be formed by the mold shown in FIGS. 5 and 6;

FIG. 9 is a front view of a multi-segment layered sheet member of a fishing pole grip prior to being formed into working shape;

FIG. 10 is a vertical cross-sectional view showing a horizontal seam taken along the line designated 10-10 in FIG. 9;

FIG. 11 is a front view of a multi-segment single sheet after it is removed from yet another version of the mold shown in FIG. 8;

FIG. 12 shows the interior surface of the multi-segment single sheet after the top, bottom and side edges thereof have been skived;

FIG. 13 is a perspective view of a first sheet and inserts being coupled to a backing sheet according to one embodiment;

FIG. 14 is a perspective view of a sheet according to one embodiment;

FIG. 15 is a horizontal cross-sectional view of a sheet member of a sheet grip during a step according to one embodiment;

FIG. 16 is a perspective view of a multi-sheet sheet being coupled to a backing sheet according to one embodiment;

FIG. 17 is a perspective view of a coupled multi-sheet sheet of a sheet grip according to one embodiment;

FIG. 23 is a partial schematic cross-sectional view taken along the line 23-23 in FIG. 21;

FIG. 24 is a partial schematic cross-sectional view of a painted sheet;

FIG. 25 is a front view of a sheet shaped grip interface of a grip according to one embodiment;

FIG. 26 shows the top and bottom edges of a sheet being skived;

FIG. 27 shows a first side edge of the sheet being skived;

FIG. 28 shows a second side edge of the sheet being skived;

FIG. 29 shows the interior surface of the sheet after the top, bottom and side edges thereof have been skived in the manner depicted in FIGS. 26, 27, and 28;

FIG. 30 is a partial schematic cross-sectional view taken along the line 30-30 in FIG. 29;

FIG. 31 is a partial schematic cross-sectional view taken along the line 31-31 in FIG. 29;

FIG. 32 is a perspective view of an inner strength sheet member being coupled to an outer multilayered sheet member of a sheet grip according to one embodiment;

FIG. 33 is a perspective view of a coupled multilayer sheet member of a sheet grip according to one embodiment;

FIG. 34 is a horizontal cross-sectional view taken along the line designated 34-34 in FIG. 33;

FIG. 35 is an enlarged view of the encircled area designated 35 in FIG. 34;

FIG. 36 is an enlarged view of the encircled area designated 36 in FIG. 34;

FIG. 37 is a perspective view of an inner strength sheet member being coupled to an outer multilayered sheet member of a sheet grip according to one embodiment;

FIG. 38 is a perspective view of a coupled multilayer sheet member of a sheet grip according to one embodiment;

FIG. 39 is a horizontal cross-sectional view taken along the line designated 39-39 in FIG. 38;

FIG. 40 is a perspective view of an inner strength sheet member being coupled to outer multilayered sheet members of a sheet grip according to one embodiment;

FIG. 41 is a perspective view of a coupled multilayer sheet member of a sheet grip according to one embodiment;

FIG. 42 is a front view of a mounting tube member of a sheet grip according to one embodiment;

FIG. 43 is a vertical cross-sectional view taken along the line designated 43-43 in FIG. 42;

FIG. 44 is an enlarged view of the encircled area designated 44 in FIG. 43;

FIG. 45 is an enlarged view of the encircled area designated 45 in FIG. 43;

FIG. 46 is a rear view showing adhesive being applied to a sheet of a grip according to one embodiment;

FIG. 47 is a front view showing adhesive being applied to the exterior of an mounting tube according to one embodiment;

FIG. 48 is a side elevational view showing a first step in wrapping and adhering the single sheet to a mounting tube;

FIG. 49 is a side elevational view showing the second step in wrapping the single sheet around a mounting tube;

FIG. 58 is a rear view of a sheet member coupled to a mounting tube according to one embodiment;

FIG. 59 is a cross-sectional view of a sheet member coupling to the mounting tube;

FIG. 60 is a cross-sectional view of a sheet member coupling to the mounting tube;

FIG. 61 is a cross-sectional view taken along the line designated 61-61 in FIG. 58;

FIG. 62 is an enlarged view of the encircled area designated 62 in FIG. 60;

FIG. 63 is an enlarged view of the encircled area designated 63 in FIG. 61;

FIG. 64 is a broken side elevational view of one embodiment of a step of making a grip;

FIG. 65 is a broken side elevational view of one embodiment of another step of making a grip;

FIG. 66 is a side elevational view of a completed single sheet grip;

FIG. 78 is a rear view of another multi-sheet member coupled to a mounting tube according to one embodiment;

FIG. 79 is a rear view of yet another multi-sheet member coupled to a mounting tube according to one embodiment;

FIG. 80 is a rear view of a patterned member coupled to a mounting tube according to one embodiment;

DETAILED DESCRIPTION

Figure 18:
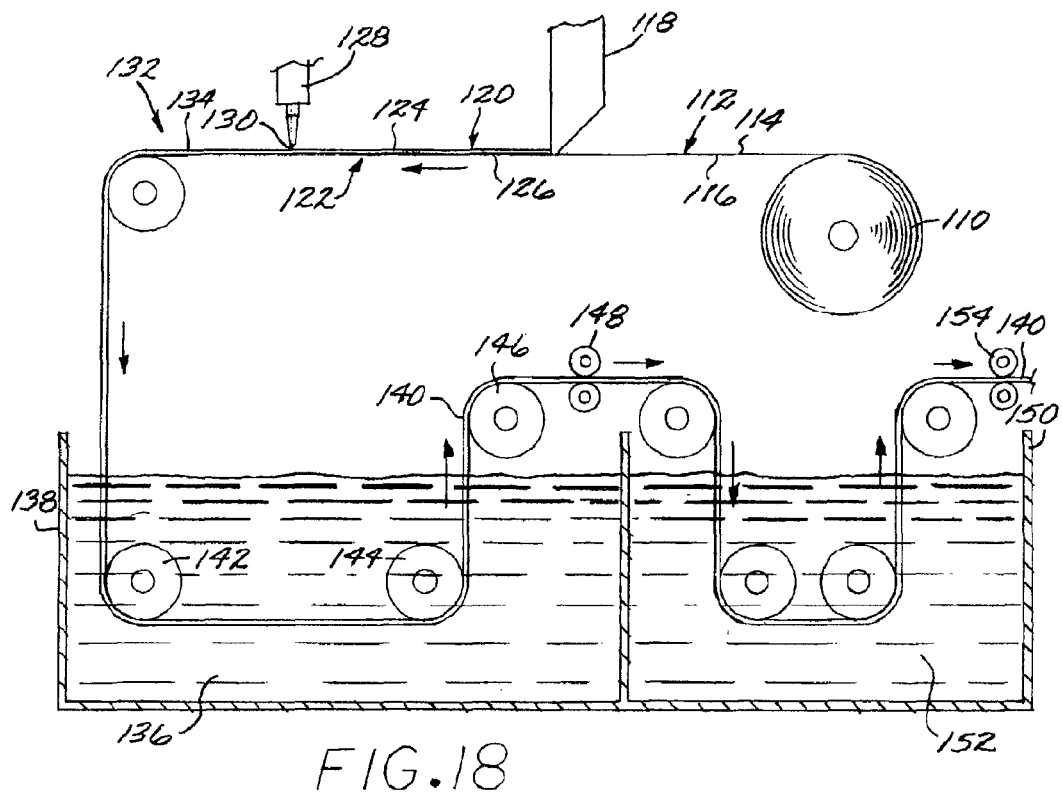
FIG. 18 is a schematic view showing a portion of a method of making a sheet according to one embodiment.

Referring to the drawings, in FIG. 1 one embodiment of a grip G is shown attached to the shaft 2 of a fishing pole FP. The fishing pole FP includes line guides or rings 4 for receiving fishing line. Though not shown, a reel may also be attached to the fishing pole FP.

Figure 50:
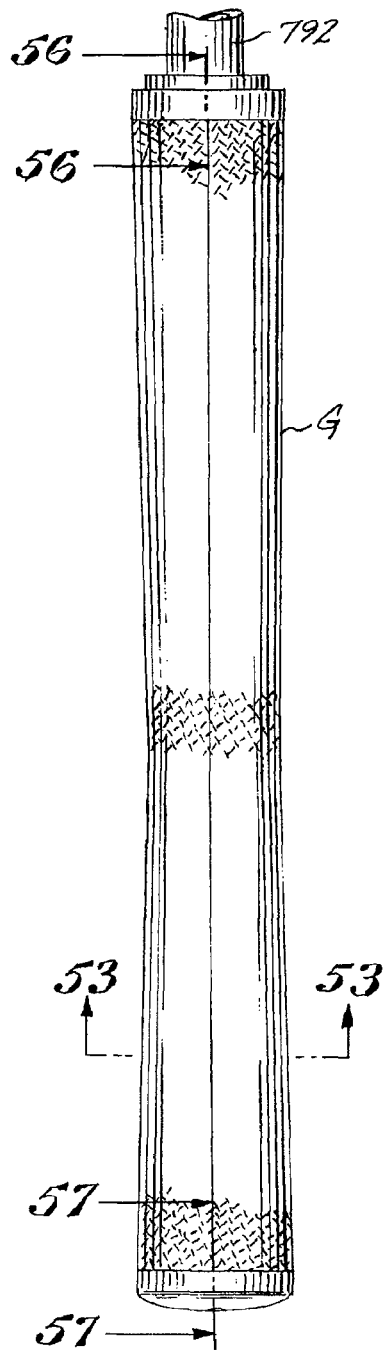
FIG. 50 is a side elevational view showing the single sheet after it has been adhered to the mounting tube.
Figure 51:
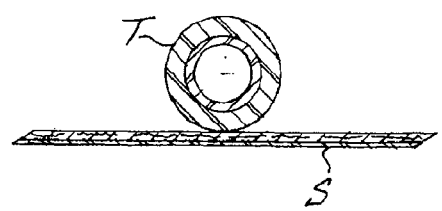
FIG. 51 is a horizontal sectional view taken along line 51-51 of FIG. 48.
Figure 52:
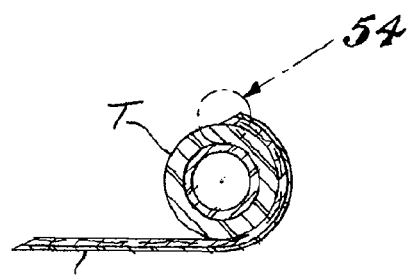
FIG. 52 is a horizontal sectional view taken along line 52-52 of FIG. 49.
Figure 53:
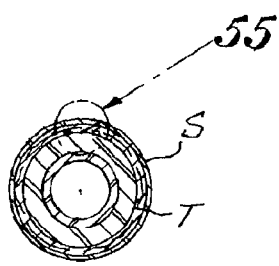
FIG. 53 is a horizontal sectional view taken along line 53-53 of FIG. 50.
Figure 54:
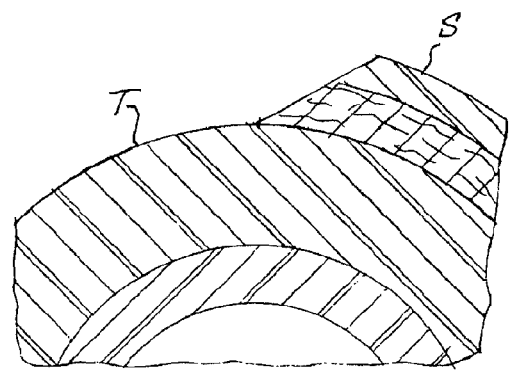
FIG. 54 is an enlarged view of the encircled area designated 54 in FIG. 52.

Referring now to the remaining drawings, certain embodiments of the grip G include a single sheet S1 formed of a bonded-together outer layer 6 and an inner layer 8 which are wrapped about and adhered to a resilient mounting tube T (see, e.g., FIGS. 48 through 50). In one embodiment, the sheet S1 is a panel.

More particularly, referring to FIGS. 2 through 4, inner layer 8 has its outer surface bonded to the inner surface of outer layer 6, with such outer layer 6 in one embodiment including a polymer. In some embodiments, outer layer 6 includes polyurethane. The outer layer 6 in certain embodiments is coagulated to define pores (not shown). In addition, additional materials such as waterproofing coatings may be incorporated on the outer surface of outer layer 6. Inner layer 8 may be fabricated of wool, polyester, nylon, or mixtures thereof. In certain embodiments, a nylon polyester fibrous material such as felt is used. In another embodiment, inner layer 8 may comprise a polymer, more preferably ethylene vinyl acetate (EVA).

In some embodiments, outer layer 6 may be formed by coating one side of a fibrous substrate (e.g., a nylon polyester fibrous material such as felt) with a solution of polyurethane (e.g., polyester, polyether) dissolved in dimethyl formamide (DMF), immersing the coated substrate in water baths to displace the DMF and cause the urethanes to coagulate, and finally driving off the water by the application of pressure and heat (FIG. 18). The solids content of the polyurethane will vary in accordance with the desired hardness of such polyurethane. In one embodiment, a solids content solution is approximately 28.5-30.5%, with a viscosity range of about 60,000-90,000 cps measured at 25±0.5 degrees C. Suitable polymer ingredients, e.g., for polyurethane, can be purchased from the following companies: Lidye Chemical Co., Ltd., 10F1 Lidye-Commercial Bldg., 22 Nanking W. Road, Taipei, Taiwan, R.O.C.; Lidye Chemical Co., Ltd., No. 17, Ching Chien 6.sup.th Road, Guan in Industrial Area, Guan In Shiang, Taoyuan Hsien, Taiwan, R.O.C.; and Lidye Resin (Panyu) Co., Ltd., Xiadao Industrial Park, Liye Road, Dongchong Town, Panyu City, Guangdong Province, PRC.

In certain embodiments, the thickness of outer layer 6 is in the range of approximately 0.3-0.5 millimeters, and the thickness of inner layer 8 is in the range of approximately 0.8-1.7 mm (millimeters). In another embodiment, the thickness of outer layer 6 is in the range of approximately 0.1-0.7 mm, and the thickness of inner layer 8 is in the range of approximately 0.5-3.0 mm. In still other embodiments, the thickness of outer layer 6 is in the range of approximately 0.05-1.0 mm, and the thickness of inner layer 8 is in the range of approximately 0.1-5.0 mm. A ratio of the thickness of outer layer 6 to inner layer 8 in one embodiment is approximately 1 to 2. In some embodiments, the ratio is approximately 1 to 2.5.

Outer layer 6 provides a cushioned grasp of a fisher's hands on a fishing pole and also enhances the fisher's grip by providing increased tackiness between the fisher's hand and the grip. Inner layer 8 provides strength to outer layer 6 and serves as a means for attaching the bonded-together layered sheet S to mounting tube T.

The outer surface of inner layer 8 in some embodiments is bonded to the inner surface of outer layer 6. For purposes of this disclosure, the definition of bonding is intended to have a broad meaning, including commonly understood definitions of bonding, adhering, fixing, attaching, sewing, coupling, and gluing. As will be understood by those of skill in the art, the foregoing terms have their ordinary meaning. In some embodiments, the material used in the outer layer may penetrate some distance into the inner layer. When polyurethane is used in outer layer 6, such polyurethane is preferably coagulated to define pores (not shown). The polyurethane may be coagulated and bonded directly to inner layer 8, or may be first coagulated on an intermediary layer (not shown) and later attached to inner layer 8.

Figure 76:
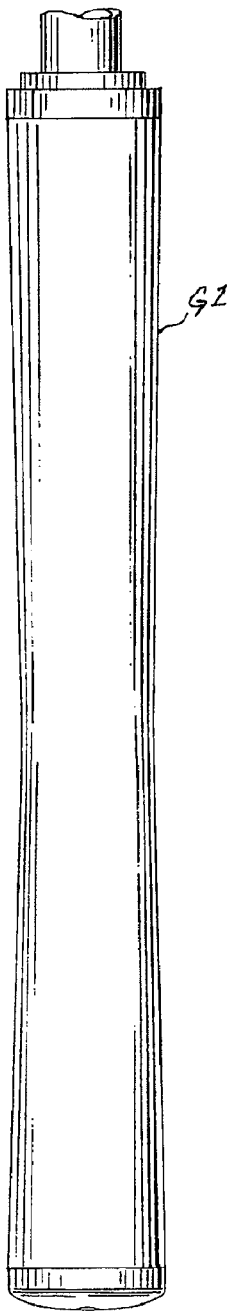
FIG. 76 is a rear view of a sheet member coupled to a mounting tube according to one embodiment.

Sheet S1 may include centering notches N1, N2 indicating a middle point for application of the completed grip sheet to mounting tube T to form complete grip G (see FIGS. 48 through 50). Alternatively, notches N1, N2 are not included. An embodiment of a completed grip G1 incorporating sheet S1 is shown in FIG. 76.

Referring now to FIGS. 5 through 8, there is shown a mold M1 which is utilized to form a friction enhancing pattern 24. Friction enhancing pattern 24 may take any of a number of forms or combinations thereof. For example, two such patterns 24*a* and 24*b* are shown in FIGS. 7 and 8, respectively. In alternative embodiments, mold M1 forms logos, designs, insignias and other marks (not shown) in outer layer 6 of sheet S1. Mold M1 in one embodiment includes a base plate B1 and a heated platen 10 formed with a cavity 12. Platen 10 is provided with depending protrusions 16 that engage an outer surface 18 of the sheet S1 so as to form depressed friction enhancing pattern 24, as seen in FIG. 6. In other embodiments, friction enhancing pattern 24 may also be applied to other sheets described below.

In alternative embodiments, other patterns may be formed on outer layer 6. These patterns may also incorporate stamped visual indicia, including designs or logos, on sheet S. Stamped visual indicia is ink stamped onto outer layer 6 using a suitable ink known to those of skill in the art. The ink in some implementations is waterproof, heat resistant and formulated to resist degradation when coming into contact with a lubrication fluid or solvent used to apply completed grip G over the end of the fishing pole FP shaft 2 (FIG. 1). It is to be understood that the figures herein presented are representative only and many other patterns and stamps may be used with this sheet grip.

In FIGS. 9 and 10, a contiguous multi-segment single sheet S2 is shown. Two separate sheets SS1, SS2 are used to form the sheet SS2 by skiving edges 36, 38 of sheets SS1, SS2, respectively, and adhering sheets SS1, SS2 together along the skived edges. Examples of skiving are shown in FIGS. 26 through 28. After application of an adhesive, skived edges 36, 38 abut and are pressed together such that the once separate sheets SS1, SS2 now form a contiguous multi-segment sheet SS2 with a substantially horizontal seam 26, as shown in FIG. 9.

FIG. 10 is a horizontal sectional view taken along the line designated 10-10 in FIG. 9. The inner layer—inner layer bond between inner layer 8*a* of first sheet SS1 and inner layer 8*b* of second sheet SS2 adds structural integrity to sheet SS2.

One method of forming sheet S2 is to skive bottom edge 36 of first sheet SS1 downwardly and outwardly from its inside layer 8*a* to its outer layer 6*a* (FIG. 27) while skiving top edge 38 of second sheet SS2 in a similar manner, noting that in one embodiment second sheet SS2 is secured with its outside layer 6*b* facing up towards the pressure plate 226, whereas the first sheet SS1 is skived with its inside layer 8*a* facing up towards pressure plate 226. Advantageously, outer surface 32b of second sheet SS2 and skived top edge 38 of second sheet SS2 form an included obtuse angle, in some embodiments an included obtuse angle of over 110 degrees and in some embodiments an included obtuse angle of roughly 130-160 degrees. In some embodiments the angle is roughly 135 degrees. An inner surface 34a of first sheet SS1 and skived bottom edge 36 of first sheet SS1 desirably form a complementary included acute angle to the angle formed by outer surface 32b of second sheet SS2 and skived top edge 38 of second sheet SS2.

While there are other ways to manufacture sheet S2, this structure is beneficial for several reasons. As fishers cast, they may place pressure on the horizontal seam. The illustrate sheet S2 allows this pressure to be applied without encouraging the sheets to separate from mounting tube T. That is, the thin uppermost portion of top edge 38 of second sheet SS2 is protected from rolling downward by overlapping bottom edge 36 of first sheet SS1. Significantly, this thin uppermost portion of top edge 38 of second sheet SS2 is glued to the structurally strong portion of bottom edge 36 of first sheet SS1.

In certain embodiments, the only thin upward facing portion of the edge at seam 26, the thin uppermost portion of top edge 38 of second sheet SS2, is safely enclosed on the inside of grip G and securely attached to mounting tube T. While the outside of grip G is exposed by definition, the portion of seam 26 that is exposed is the lowermost portion of the bottom edge 36 of first sheet SS1. This lowermost portion of bottom edge 36 is downward facing and thus naturally allows the thumb or other finger to roll over it without encouraging premature unraveling. Even if sheets SS1, SS2 were somewhat misaligned, so that a portion of the upwardly facing edge of top edge 38 on second sheet SS2 were exposed, the exposed portion would be almost as thick as the body of sheet SS2 and, thus, structurally strong. Importantly, the acute angle formed by top edge 38 of second sheet SS2 and outer surface 32a of first sheet SS1 would tend to guide the user's thumb or finger outward and downward, away from the thin uppermost portion of top edge 38 of the second sheet SS2. As such, this preferred configuration discourages unraveling, even in the event of misalignment.

Further, it is less distracting for the fisher when the seam is fluid, another advantageous result of horizontal seam 26 made with skiving because outer layer 32a of first sheet SS1 flows over second sheet SS2. Regardless, the skiving is performed such that the outer layer 6a of first sheet SS1 and outer layer 6b of second sheet SS2 are on the same side of the contiguous multi-segment sheet S2 to form a contiguous outside layer 28 of sheet S2 (FIG. 9). Once each sheet SS1, SS2 has its respective skived edge, the segments are ready to be bonded.

Referring now to FIG. 11 there is shown other patterns which may be formed on outer layer 6. The second pattern 40 incorporates visual indicia extending the majority of the length of sheet S2 surrounded by a tread pattern similar to friction enhancing pattern 24 in FIGS. 7 and 8. FIG. 11 also shows an alternative means for imputing decorative designs or logos on grip sheet S2. Stamped visual indicia, such as logo 42, is ink stamped onto outer layer 6 using a suitable ink as known to those of skill working with polyurethane backed with a strengthening layer. Preferably, the ink is waterproof and heat resistant and, more preferably, formulated to resist degradation when coming into contact with the lubrication fluid or solvent used to apply the completed grip G (mounting tube T with sheet S) over the end of a fishing pole FP shaft 2 (FIG. 1). It is to be understood that these are representative and many other patterns and stamps may be used with this multi-segment single sheet S2. In addition, the patterns shown may be used with other sheets, such as the single sheet S of FIG. 2.

Figure 77:
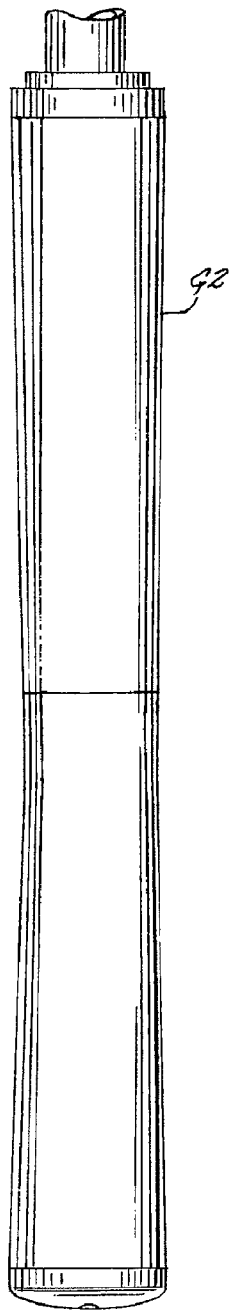
FIG. 77 is a rear view of a multi-sheet member coupled to a mounting tube according to one embodiment.

FIG. 12 is a rear view of the sheet S2 after the rotating knives 210, 212, 218 (FIGS. 26 through 28) have skived the edges 44, 46, 48, 50. An embodiment of a completed grip G2 incorporating the sheet S2 is shown in FIG. 77.

FIGS. 13 and 14, depict additional embodiments of a sheet S3 wherein a sheet 64 includes cutouts or inserts 52, 54, 56, 58, 60 which are preferably arranged on a backing sheet 62. In one embodiment, sheet 64 is cut, sliced and/or otherwise removed and separated from a larger sheet of material (not shown). Sheet 64 may also be formed according to practices well known to those of skill working with polyurethane backed with a strengthening layer. Inserts 52, 54, 56, 58, 60 are preferably formed by similar means.

Similarly, inserts 52, 54, 56, 58, 60 are preferably removed and separated from larger sheets of material. Advantageously, sheet 64 and inserts 52, 54, 56, 58, 60 may include materials of one or more differing properties and may be positioned to maximize the benefit of one or more of those properties. For example, there may be locations of increased wear on the grip G during use. Cutouts may be strategically placed in these areas of increased wear and corresponding inserts may be placed in those areas. These inserts may include materials of increased strength, durability, durometer, etc., which may make them better suited to absorb the forces imparted to those areas of the grip. As those of skill in the art will appreciate from the foregoing, these inserts may have different levels of tackiness and that the inserts could be selected based on tackiness.

It also may be desirous to include certain areas of a different color. In such an instance, cutouts may be formed and correspondingly shaped inserts may be used in those locations with different colors. In addition, sheet 64 or inserts 52, 54, 56, 58, 60 may include one or more friction enhancing patterns such as those shown in FIGS. 7, 8, and 11 prior to being formed into sheet S3, or may be manipulated to include these patterns after being formed into sheet S3. In the earlier case, the patterns may be formed when the components are cut from the larger sheets or they may be formed in a separate step. These different colors may be used on cutouts with the same physical properties and/or cutouts having the same physical properties may share the same color.

The backing sheet 62 is preferably an adhesive coated plastic. The adhesive used is preferably strong enough to maintain the relative positions of the sheet and the inserts; however, it is preferably removable prior to bonding sheet S3 to mounting tube T. In some embodiments, backing sheet 62 is removed after sheet 64 and inserts 52, 54, 56, 58, 60 have been joined, as shown in FIG. 15. Alternatively, backing sheet 62 may comprise a thin layer of material intended to remain on grip G. For example, a thin sheet of fibrous material (e.g., felt) or other strength material may be used and permanently joined or bonded to the backs of sheet 64 and inserts 52, 54, 56, 58, 60.

As shown in FIG. 13, sheet 64 and inserts 52, 54, 56, 58, 60 are preferably arranged on backing sheet 62. Sheet 64 and inserts 52, 54, 56, 58, 60 are preferably held in position by backing sheet 62 such that their sides are in contact with each other to form intersections 66. These intersections 66 may include one or more adhesives to bond or join the sides of the inserts 52, 54, 56, 58, 60 to the sides of the sheet. If a multiple layered sheet is desired, and the inner layer includes a fibrous material such as felt, an adhesive with the chemical formula toluene ($CH_5CH_3$), ethyl acetate ($C_4H_8O_2$), methyl ethyl ketone ($C_4H_8O$), and acetone ($C_3H_6O$) may be used between the layers of fibrous material along at least a portion of the intersection. If an outer layer of polymer (e.g., polyurethane) is used, the adhesive between the polymer layers along at least a portion of the intersection may be a polymer deposit. In some embodiments, the adhesive includes polyurethane. An embodiment of a grip G3 incorporating the sheet S3 is shown in FIG. 78.

Referring now to FIGS. 16 and 17, there is shown yet another embodiment. Coupled multilayered sheet S4 is formed from components similar to those used to form sheet S3. A backing sheet 70 is coupled to outer multilayered sheets 72a and 72b. Preferably, sheet S4 is shaped such that when it is wrapped about a mounting tube T, it generally covers the mounting tube T as described below. Outer sheets 72a and 72b may include centering notches N1, N2. In some embodiments, notches N1, N2 are not included.

Outer sheets 72a and 72b are preferably secured to backing sheet 70 by an adhesive on their inner surfaces (not shown). Outer sheets 72a and 72b may also be secured to backing sheet 70 by an adhesive on the outer surface 78 of backing sheet 70. Outer sheets 72a and 72b may also be coupled to backing sheet 70 by a combination of an adhesive on each of the inner surfaces (not shown) of outer sheets 72a and 72b and outer surface 78 of backing sheet 70.

Advantageously, outer sheet 72a may be directly coupled to outer sheet 72b. Sheet 72a in one embodiment defines an outer abutment surface 80a. Outer abutment surface 80a, in turn, comprises an outer abutment surface 80a corresponding to an outer layer 82a of outer sheet 72a and an outer abutment surface 80a b corresponding to backing sheet 84a of outer sheet 72a. Outer sheet 72b defines an outer abutment surface 86a. The outer abutment surface 86a, in turn, comprises an outer abutment surface (not shown) corresponding to the outer layer 82b of outer sheet 72b and an outer abutment surface (not shown) corresponding to backing sheet 84b of outer sheet 72b. In one embodiment, outer abutment surfaces 80a and 86a form an internal outer attachment interface 88. In this embodiment, outer attachment interface 88 preferably extends substantially the distance between a top region 90 of the outer sheet 72 and a bottom region 92 of outer sheet 72, thereby defining first and second sections of outer sheet 72. In alternative embodiments, outer sheet 72 may include additional sections connected in a similar manner.

Outer surface 78 of the backing sheet 70 cooperates with the inner surfaces (not shown) of outer sheets 72a and 72b to define an intermediate attachment interface 94. Intermediate attachment interface 94, in turn, comprises an intermediate attachment interface 94a corresponding to outer surface 78 of backing sheet 70 and an inner surface of outer sheet 72a and an intermediate attachment interface 94b corresponding to outer surface 78 of backing sheet 70 and an inner surface of outer sheet 72b. The internal seam 96 is generally an interface connecting portions of sheet 72. These and other structures described herein provide additional support to sheet interfaces to resist the forces imparted on the grip as it is used by the fisher.

In some embodiments, backing sheet 70 is removed after outer sheets 72a, 72b have been joined, similar to backing sheet 62 shown in FIG. 15. Alternatively, backing sheet 70 may comprise a thin layer of material intended to remain on grip G. For example, a thin sheet of fibrous material (e.g., felt) or other strength material may be used and permanently joined or bonded to the backs of outer sheets 72a, 72b.

An embodiment of coupled multilayered sheet S4 is, for example, coupled to mounting tube T to form grip G4, as shown, for example, in FIG. 78 and described herein below.

One added advantage of certain embodiments of the present invention is that it allows for multiple variations to a grip which may include additional vertical sheets, as shown in, for example, FIGS. 16 and 17.

Figure 19:
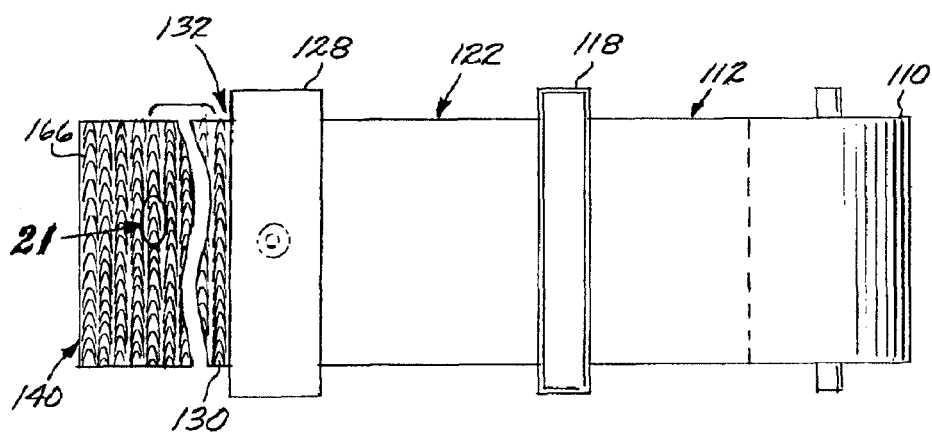
FIG. 19 is a top view of a portion of the schematic view shown in FIG. 18.

Referring to FIGS. 18 and 19, there is shown a method of forming a sheet 140. Referring to the upper right-hand portion of FIG. 18, there is shown a supply roll 110 of substrate 112. Substrate 112 has a top surface 114 and a bottom surface 116. In one embodiment, substrate 112 is a fibrous material, such as a fabric (e.g., felt), which may include wool, polyester, nylon, or mixtures thereof. Preferably, substrate 112 comprises a felt including nylon and polyester. From supply roll 110, substrate 112 is moved horizontally to the left below a first polyurethane dispensing machine 118. First dispensing machine 118 preferably continually deposits a first region of liquid polymer (e.g., polyurethane) 120, for example polyester or polyether dissolved in dimethyl formamide (DMF), onto top surface 114 of substrate 112 to form first web 122. First dispensing machine 118 preferably uses a nozzle, sprayer or the like to deposit first polymer region 120 and preferably uses a blade to control the thickness of first polymer region 120. First polymer region 120 has a top surface 124 and a bottom surface 126.

As first web 122 continues to the left from first dispensing machine 118, a second polymer dispensing machine 128 deposits a second liquid polymer region 130 onto at least a portion of top surface 124 of first polymer region 120 to form second web 132. Second polymer region 130 has a top surface 134. Second web 132 is then moved into a water bath 136 contained in a first tank 138. As second web 132 is immersed in water bath 136, polymers 120 and 130 will coagulate so as to form a coagulated region 102 (see FIG. 23) on substrate 112. Coagulated region 102 and substrate 112 cooperate to form sheet 140.

As is known, the coagulation time of a polymer such as polyurethane will be determined by the desired thickness of coagulated region 102, with a thin region requiring less time to coagulate than a thick region. In some embodiments, the coagulation process bonds a bottom surface 106 (FIG. 23) of coagulated region 102 to the top surface (not shown) of substrate 112 so as to fix coagulated region 102 to substrate 112. A pair of rollers 142 and 144 are positioned within tank 138 to carry sheet 140 horizontally and then upwardly out of water bath 136 over roller 146. Sheet 140 is then moved horizontally to the right between a pair of squeezing rollers 148. Squeezing rollers 148 compress sheet 140 so as to force a major portion of the DMF disposed within pores (not shown) downwardly through substrate 112. In one embodiment, the bottom end of a sufficient number of the pores are in contact with the top surface of substrate 112 to permit fluid flow from the pores through substrate 112.

Sheet 140 is then moved downwardly through one or more cleaning water bath tanks 150 (only one of which is shown), wherein the temperature of the water is sufficiently high to displace more DMF from the pores, with such DMF being replaced by the water contained in tank 150. From tank 150, sheet 140 passes through another pair of squeezing rollers 154 to squeeze more of the DMF out of the pores to be replaced with water 152. In practice, it may be necessary to utilize four or five cleaning baths to remove a desired amount of DMF from the pores. From the last water bath, sheet 140 is passed through a heating chamber (not shown) which drives out any water remaining within the pores so that such water is replaced by air.

In another embodiment (not shown), a bond interface is formed by the coagulation process, such that bottom surface 106 of coagulated region 102 is bonded to top surface 114 of substrate 112 so as to fix coagulated region 102 to substrate 112. Substrate 112 in one embodiment includes a flexible temporary support for the polymer during the wet coagulation process described above. Such a temporary support would be configured to be removed from bottom surface 106 of coagulated region 102 after sheet 140 is formed. In such an embodiment, the bond interface is desirably relatively weak to facilitate separation of coagulated region 102 from substrate 112. One preferred temporary support includes a smooth, flexible nylon cloth and is available from the Ho Ya Electric Bond Factory, Xin Xing Ind. Area. Xin Feng W. Rd., Shi Jie Town Dong Guan City, Guan Dong Province, China. Other materials include fluid-permeable textiles such as cotton or a synthetic cloth such as polyester.

Preferably, the temporary support would have the fluid-passing characteristics and smooth top surface of nylon cloth allowing the DMF and water to be squeezed out of the polyurethane pores and allowing the coagulated polyurethane to be readily stripped off such temporary support. Removing substrate 112 from coagulated region 102 provides for use of coagulated region 102 alone or provides the opportunity to use an alternative substrate. For example, it is possible to replace substrate 112 with a polymer region such as a region of ethylene-vinyl acetate (EVA). The EVA region may include an adhesive coating to bond the EVA region to the coagulated polyurethane region. EVA having an adhesive coating covered by a protective paper is sold by the aforementioned Ho Ya Electric Bond Factory.

Figure 20:
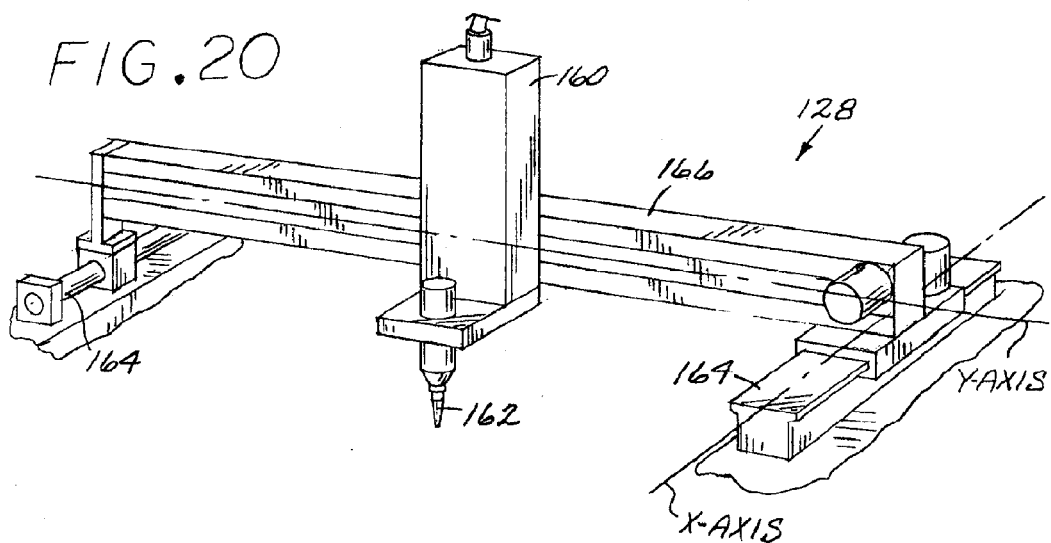
FIG. 20 is a schematic view showing an apparatus for use in a portion of a method of making a sheet according to one embodiment.

Referring now to FIG. 20, a schematic illustration of second dispensing machine 128 is shown. In FIG. 20, dispensing machine 128 preferably includes a first housing 160 having a first dispensing nozzle 162. Housing 160 is connected to perpendicular rail 166 extending along the Y axis as illustrated. Rail 166, in turn, is connected to parallel rails 164 extending along the X axis as illustrated. Dispensing machine 128 is configured to allow first web 122 of substrate 112 and first polymer region 120 to pass beneath nozzle 162, preferably at a constant pace, along the X axis. First polymer region 120 may provide a base region for second polymer region 130. In some regions, the second polymer region 130 may extend completely through first polymer region 120 to be in contact with substrate 112. Dispensing machine 128 is preferably further configured to move nozzle 152 in one or both of the X and Y directions. In addition, nozzle 152 may be configured to start and stop depositing the second polymer 130 as desired. The movement of the nozzle 152 in the X and Y directions and the start/stop feature of the nozzle 152 provides for the ability to create a unique appearance which may include random or semi-random patterns 166 in the second web 132 and, in turn, in sheet 140 (see FIG. 19). In other embodiments, the web 122 is moved beneath a stationary nozzle 152 to create a pattern. For example, nozzle 152 could be fixed along the X axis and the pace with which the web 122 is moved under the nozzle 152 can be varied. Similarly, nozzle 152 could be fixed along the Y axis and the web 122 be shifted along the Y axis instead. Alternatively, the nozzle 152 can be moved in both directions.

In other embodiments (not shown), dispensing machine 128 may include two, three, or more nozzles 152 for dispensing third, forth, etc. polymer regions. Such additional nozzles may be included in the same housing, separate housings, or a combination thereof. It is also possible to include additional dispensing machines on separate rails to introduce still further variation in the application of the polymer regions.

Figure 21:
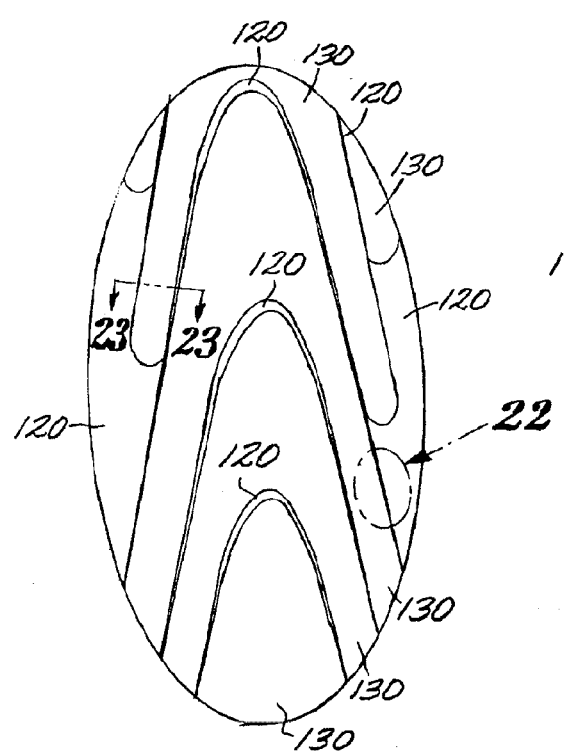
FIG. 21 is an enlarged view of the encircled area designated 21 in FIG. 19.
Figure 22:
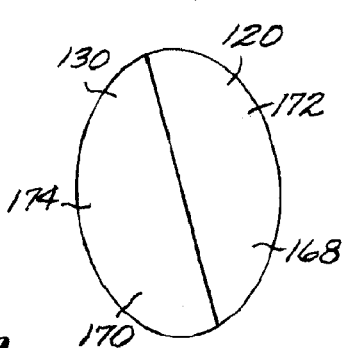
FIG. 22 is an enlarged view of the encircled area designated 22 in FIG. 21.

Referring now to FIG. 21, there is shown an enlarged view of the pattern 166 formed in the coagulated region 102 of sheet 140. Generally, a top surface 104 (FIG. 23) of a coagulated region 102 includes pattern 166 because the first polymer 120 and the second polymer 130 each include at least one contrasting characteristic. In the illustrated embodiment, the contrasting characteristic is color. However, other contrasting characteristics, or combinations thereof, could be incorporated to create the pattern such as contrasting durometers or levels of tackiness. In the figures, first polymer 120 defines a first color 168 and second polymer 130 defines a second color 170. As shown in greater detail in FIG. 22, the pattern 166 on the top surface 104 of the coagulated region 102 includes a first region 172 and a second region 174 defined by the first color 168 of the first polymer 120 and the second color 170 of the second polymer 130, respectively.

As described above, the two polymers 120 and 16 are coagulated in the first water bath 136 onto substrate 112. The application of the second polymer 130 onto a portion of the top surface 124 of the first polymer 120 prior to coagulation allows for the polymers to mix and integrate below the top surface 124 of the first polymer region such that coagulation of the polymers forms a single coagulated region 102. Despite the mixing of the two polymers prior to coagulation, and the integration of the two polymers during coagulation, each of the polymers substantially maintains its original characteristics. The contrast in one or more characteristics of the polymers creates the pattern 166. Though the characteristics remain substantially distinct, there may be some blending along the interface of the two polymers.

The structure of the coagulated region 102 in certain embodiments is therefore not just seamless and not just coagulated, but the two polymers polymerize with each other to form the coagulated region 102. Accordingly, the coagulated region 102 is a polymerized region. Coagulated region 102 preferably further includes a plurality of generally vertically extending pores (not shown), the top surface 104, and the bottom surface 106. The pores 24 generally form throughout coagulated region 102 including in the regions where the first polyurethane 120 interfaces with the second polyurethane 130 between the top 104 and bottom 106 surfaces. Though polyurethane is preferred to form the coagulated region, other liquid polymers having contrasting characteristics may be used. Generally, the polymers will be combined while in their liquid states and allowed to polymerize together. As the polymers polymerize together, the structure of the polymerized region 102 will preferably be seamless while maintaining the contrasting characteristics at least on the outer surface (top surface 104) of the polymerized region 102.

The top surface 124 of first polymer region 120 cooperates with the top surface 134 of the second polymer region 130 to form a substantially smooth top surface 104 of the coagulated region 102. Contrasting colors 168 and 170 on a surface cooperate to create the pattern 166. If the first polymer is red and the second polymer is white, the process discussed above would result in a coagulated polymer region with distinct red and white regions, rather than a single blended pink region. Though the contrasting characteristics of the first 120 and second 130 polymers remain substantially distinct, the polymer structure below the top surface 104 is preferably seamless between the different polymers with a preferably continuous pore structure throughout.

Certain embodiments of the present invention may be contrasted with a prior art method of using paint to create a sheet with multiple colors. In the prior art, a single polymer region is coagulated onto a substrate to form a sheet including a coagulated region. To achieve regions of different color, paint having a top surface and a bottom surface is applied to the top surface of the coagulated polymer region where desired. The polymer was coagulated prior to application of the paint and the paint forms a thin separate region over the surface of the sheet.

The prior art method of coating a coagulated region of polymer with paint alters the characteristics of the sheet. The paint does not integrate with the polymer region. Rather, the bottom surface of the paint bonds to the top surface of the polymer region. In embodiments known to the Applicant, the paint coating the surface had different tactile characteristics from the polymer it coated, including different levels of tackiness or durometer. For example, painted grips are generally less tacky in the region covered by paint than in the unpainted regions of polymer. In addition, during use, the paint on the polymer may wear off, giving the grip a weathered or worn appearance. Though valuable and unique, Applicant's other solutions for introducing contrasting characteristics (including the use of multiple sheets, strips, or inserts) result in seams between the various components.

Embodiments of the present invention allow for the manufacture of grips having regions of contrasting characteristics wherein the structure of the region is seamless. For example, a red polymer having a desired level of tackiness and durometer may be used in conjunction with a blue polymer having the same desired level of tackiness and durometer. The sheet formed from the two materials would include a uniquely colored pattern and a seamless structure having a substantially uniform level of tackiness and durometer.

Referring now to FIG. 23, there is shown a partial schematic cross-sectional view of sheet 26 taken along the line 23-23 in FIG. 21. Contrasting regions 172 and 174 are visible on top surface 23. Due to the movement of nozzle 162 relative to web 122 during the application of the second polymer 130 onto the top surface 10 of the first polymer 120, as discussed above, differing amounts of the second polymer 130 are applied in different areas or regions. As the polymers mix, second polymer 130 settles into first polymer 120.

After the water bath 136, coagulated region 102 defines a total depth $D_{PolyT}$ between its top surface 104 and its bottom surface 106. In various regions, second polymer 130 extends from the top surface 104 into the coagulated region 102 to a depth $D_{Poly2}$. The ratio of $D_{Poly2}$ to $D_{PolyT}$ may vary, depending on a number of factors including the speed with which the web 122 passes below the nozzle 162, the flow rate of the second polymer 130 from the nozzle 162, and the rate of movement of the nozzle 162 in the X and Y directions. In some embodiments, the maximum and, preferably, the average ratio of $D_{Poly2}$ to $D_{PolyT}$ in some regions is at least 1 to 15, 1 to 10, 1 to 5, 1 to 4, 1 to 3, and/or 1 to 2. In some regions, the ratio is 1 to 1 where the second polymer 130 extends from the top surface 104 to the bottom surface 106. In some embodiments, the ratio varies in different regions of the sheet 26.

As discussed above, coagulated region 102 is generally porous. This porous region has a total depth $D_{PorousT}$ between the top surface 104 and the bottom surface 106 of coagulated region 102. In various regions, the second polymer 130 extends from the top surface 104 into the porous coagulated region 102 to a maximum depth $D_{Porous2}$. The ratio of $D_{Porous2}$ to $D_{PorousT}$ may vary. In some embodiments, the maximum and, preferably, the average ratio of $D_{Porous2}$ to $D_{PorousT}$ in some regions is at least 1 to 50, 1 to 40, 1 to 30, 1 to 20, 1 to 15, 1 to 10, 1 to 5, 1 to 4, 1 to 3, and/or 1 to 2. In some regions, the ratio is 1 to 1 where the second polymer 130 extends through the porous coagulated region 102 from the top surface 104 to the bottom surface 106. In some embodiments, the ratio varies in different regions of the sheet 140.

The pattern 166 shown in the figures is an example of the patterns achievable with Applicant's method of making the polymer sheet. Other patterns are also possible. For example, in some embodiments, nozzle 162 is held steady as second polymer 130 is applied to web 122 to create a solid band of second polymer 130 across the upper surface 124 of first polymer 120. Depending on how the sheet 140 is formed into grip interface I, the band may extend horizontally, vertically, or at an angle on the grip interface I.

In some embodiments, top surface 124 of the first polymer region 120 forms substantially all of the top surface 104 of coagulated region 102. In such embodiments, relatively smaller quantities of second polymer 130 may be applied prior to the coagulation process. In other embodiments, top surface 134 of the second polymer 130 forms substantially all of the top surface 104 of coagulated region 102. In such embodiments, relatively large quantities of second polymer 130 may be applied prior to the coagulation process. Embodiments of the present invention may include different regions of similar patterns. In some, the pattern may be repeated and positioned such that a grip interface I formed from the sheet includes at least three regions having contrasting characteristics, such as colors. In some embodiments, a grip interface I may be formed with at least 5 regions of contrasting characteristics. In some, there may be at least 7 regions of contrasting characteristics. In some, there may be 10 or more regions of contrasting characteristics. These regions of contrasting characteristics may be arranged throughout the top surface 104 of the coagulated region 102 of the grip interface I, whether across the width of the grip interface I, along the length of grip interface I, or in a combination of the two.

Referring now to FIG. 24, there is shown a partial schematic cross-sectional view of a paint covered sheet. Coagulated region 180 is porous and includes a generally smooth top surface 182 and a bottom surface 188. Top surface 182 may include one or more irregularities 184 which may extend downward into coagulated region 180. Paint 198 is applied over the top surface 182 of coagulated region 180. Due to the irregularities 184 in the top surface 182 of coagulated region 180, paint 198 may extend into coagulated region 102 to a depth $D_{Porous2}$. Though unclear, the ratio of $D_{Porous2}$ to $D_{PorousT}$ appears to be no more than 1 to 100. Thus, if the paint was a second polymer applied to the surface of a coagulated region, the ratio of $D_{Porous2}$ to $D_{PorousT}$ of a paint covered sheet is far from the 1 to 50 ratio discussed above.

As shown in FIG. 25, sheet 140 may be formed into a grip sheet S5. Preferably, sheet S5 is die cut from sheet 140. As will be understood by those of skill in the art, sheet 140 may be formed into any of a number of shapes, including strips, sheets, inserts, or sheets with cut-outs, such as those described above in relation to sheets S1, S2, S3, and S4, and below in relation to sheets S6, S7, and S8.

Sheet S5 includes top surface 200, a top side 201, a bottom side 202, a first side 204, and a second side 206. A line drawn from top side 201 to bottom side 202 on at least a portion of top surface 200 preferably crosses multiple regions of polymer having a different characteristic. In some embodiments, the sheet S5 or a different shape may include at least 2, at least 3, at least 5, at least 7, or at least 10 regions having a different characteristic along the line drawn from top side 201 to bottom side 202 on at least a portion of top surface 200. In some embodiments, the sheet S5 may include in the range of between 2 and 500 regions of at least one different characteristic along the line. It should be understood that the different characteristics of the regions may be alternating two or more colors along the line. Alternatively, the different characteristics of the regions may be alternating levels of tackiness or durometer along the line.

Similarly, a line drawn from first side 204 to second side 206 on at least a portion of top surface 200 also will preferably cross multiple regions having different characteristics. In some embodiments, the sheet S5 may include at least 2, at least 3, at least 5, at least 7, or at least 10 regions having a different characteristic along the line drawn from first side 204 to second side 206 on at least a portion of top surface 200. In some embodiments, grip interface I may include in the range of between 2 and 500 regions of at least one different characteristic along the line.

Likewise, a line drawn into sheet S5 from the top surface 200 to the bottom surface 106 of coagulated region 102 may cross multiple regions. In some embodiments, sheet S5 may include at least 2, at least 3, at least 5, at least 7, or at least 10 regions having different characteristics along the line drawn from the top surface 200 to the bottom surface 106 of coagulated region 102. In some embodiments, grip interface I may include in the range of between 2 and 50 regions of at least one different characteristic along the line.

The sheet S1 may include centering notches N1, N2 indicating a middle point for application of the completed grip sheet to mounting tube T to form complete grip G (see FIGS. 48 through 50). Alternatively, the notches N1, N2 are not included. An embodiment of a grip G5 incorporating the sheet S5 is shown in FIG. 80.

Referring now to FIGS. 26 through 28, the peripheral edges of any of the sheets S1-S5 described above are shown being skived by a pair of rotating knives 210, 212 which engage the top and bottom edges 214, 216 of a sheet S (e.g., any of the sheets described above), and a single rotating knife 218 (FIGS. 27, 28) engaging side edges 222, 224. Knives 210 and 212 form top and bottom skived edges 214, 216, respectively. Knife 218 is shown forming skived edge 222 on one side of the sheet S in FIG. 27 and the skived edge 224 in FIG. 28 after the first side has been skived. A pressure plate 226 is utilized to secure the sheets on base 228 during the skiving operation. In the depicted embodiment, the skiving on the bottom edges 214, 216 are antiparallel to each other, and the side edges 222, 224 are parallel to one another, as seen in FIG. 27. Preferably, the skiving will have a width of about 2.0-6.0 mm. More preferably, the skiving will have a width of about 2.7-4.5 mm.

As one example, FIG. 29 illustrates a rear view of a sheet S after the rotating knives 210, 212, 124 have skived the edges 214, 216, 222, 224. In addition, FIG. 29 illustrates various dimensions of the sheet S. In the depicted embodiment, the sheet S has length L, widths W1 and W2, and height H.

The length L in one embodiment is about 150 to 250 mm (millimeters). In another embodiment, the length L is about 180 to 220 mm. In still another embodiment, the length L is about 200 to 215 mm. Other lengths may be chosen to allow the grip to fit longer or shorter fishing pole rods.

The length L of the sheet S may be further subdivided into sublengths L1 and L2. In one embodiment, the sublength L2 is longer than the sublength L1, though in other embodiments, the sublengths L1, L2 are equal or approximately equal. The ratio of the sublength L2 to the sublength L1 in one embodiment is between about 1:1 and 2:1. In another embodiment, the ratio is between about 1:1 and 1.5:1. In yet another embodiment, the ratio is between about 1:1 and 1.3:1. By varying the sublengths L1 and L2, the sheet S may be coupled with a mounting tube T of varying lengths so as to enable the grip G to conform more comfortably to the hand of a user.

In the depicted embodiment, the widths W1 of each end of the sheet S are equal or approximately equal. In alternative embodiments, the widths W1 of each end of the sheet S are not equal. The depicted width W2 corresponds to the width of an interior portion of the sheet S, and more particularly in one embodiment, to the narrowest interior portion of the sheet S. The depicted embodiment of the width W2 illustrates that the width W2 of certain embodiments is smaller than the width W1. Consequently, the sheet S tapers from each end of the sheet S to an interior portion having width W2.

In one embodiment, the differing widths W1, W2 give the sheet S an hourglass or substantially hourglass shape. A grip G incorporating the sheet S having this hourglass shape is able to more comfortably fit in the hand of a user in certain embodiments. Though not shown, in alternative embodiments, the width W2 may be equal to or greater than the width W1. Such embodiments might for example be preferred by a user with larger hands.

In one embodiment, the ratio of the width W1 to the width W2 is between about 1:1 and 2:1. In another embodiment, the ratio is between about 1:1 and 1.4:1. In yet another embodiment, the ratio is between about 1.2:1 and 1.3:1.

The height H of the sheet S is also shown. In various implementations, the height may be between about 0.5 and 10 mm, between about 1 and 7 mm, between about 2 and 4 mm, or another height. Larger heights H may be chosen to increase the softness of a grip G incorporating the sheet S, and smaller heights H may be chosen to decrease the softness of the grip G.

The fibrous layer of the sheet S has a height FH, and the polymer layer of the sheet S has a height PH. In one embodiment, the ratio of the fibrous layer height FH to the polymer layer PH is between about 2:1 and 15:1. In other embodiments the ratio is between about 4:1 and 10:1. In still other embodiments, the ratio is between about 5:1 and 8:1.

The fibrous layer height FH in one embodiment is between about 1 and 5 mm. In another embodiment, the height FH is between about 2 and 4 mm. In still another embodiment, the height FH is between about 2.7 and 3.2 mm. Likewise, the polymer layer height PH in one embodiment is between about 0.1 and 1 mm. In another embodiment, the height PH is between about 0.2 and 0.7 mm. In still other embodiments, the height PH is between about 0.3 and 0.5 mm.

Some or all of the aforementioned dimensions of the sheet S may be applied to any of the sheets S1 through S8 described herein. However, alternative dimensions may be employed in other implementations.

FIGS. 30 and 31 illustrate different views of the sheet S of FIG. 29. The skiving performed on the sheet S may be performed on any of the sheets S1-S5 described above.

FIGS. 32 and 33 show a coupled multilayered sheet S6 being formed by coupling an outer sheet 302 with an inner sheet 316. As shown in FIG. 33, and in greater detail in FIGS. 34, 35, and 36, side regions 308, 310, 324, 326 of outer sheet 302 and inner sheet 316 are offset to form lateral extensions 358 and 360. FIG. 34 is a cross-sectional view of coupled sheet S6 taken along the line designated 34-34 in FIG. 33. FIG. 34 shows a preferred embodiment comprising an outer tactile layer 314 bonded to an inner strength layer 312, which is in turn coupled to an inner strength sheet 316. Coupled sheet S6 has an outer surface 398, which, as will be understood by those of skill in the art, corresponds generally with outer surface 346 of outer tactile layer 314. Similarly, coupled sheet S6 has an inner surface 300 generally corresponding to inner surface 350 of inner strength sheet 316. In the completed grip G, outer surface 398 of sheet S6 will also generally refer to the outer surface of grip G.

Outer sheet 302 is preferably secured to inner strength sheet 316 by an adhesive on an inner surface (not shown) of outer sheet 302. Outer sheet 302 may also be secured to inner sheet 316 by an adhesive on outer surface 348 of inner sheet 316. Outer sheet 302 and inner sheet 316 may also be coupled by a combination of an adhesive on each of the inner surface of outer sheet 302 and outer surface 348 of inner sheet 316. The interface between inner sheet 316 and outer sheet 302 defines an intermediate interface 362.

FIG. 36 shows an enlarged view of a first lateral extension 358. First lateral extension 358 includes an inner abutment surface 354, an intermediate abutment surface 352, and an outer abutment surface 368. Outer abutment surface 368a of outer abutment surface 368 corresponds to the portion of outer tactile layer 314 that partially defines outer abutment surface 336 of outer multilayered sheet 302. Similarly, outer abutment surface 368b of outer abutment surface 368 corresponds to the portion of inner strength layer 312 that partially defines outer abutment surface 336 of outer multilayered sheet 302. First lateral extension 358 further comprises an inner surface 356. Preferably, the portion of inner strength sheet 316 extending beyond side region 308 of outer sheet 302 that partially defines first lateral extension 358 extends laterally from outer abutment surface 368 in the range of about 1.5 to about 5.0 millimeters. More preferably, it extends in the range of about 2.5 to about 3.5 millimeters. Most preferably, it extends about 3.0 millimeters.

FIG. 35 shows an enlarged view of a second lateral extension 360. Second lateral extension 360 includes an inner abutment surface 364, an intermediate abutment surface 362, and an outer abutment surface 366. Outer abutment surface 366a of outer abutment surface 366 corresponds to the portion of outer tactile layer 314 that partially defines outer abutment surface 338 of outer multilayered sheet 302. Similarly, outer abutment surface 366b of outer abutment surface 366 corresponds to the portion of inner strength layer 312 that partially defines outer abutment surface 338 of outer multilayered sheet 302. Preferably, the portion of outer multilayered sheet 302 extending beyond side region 326 of inner sheet 316 that partially defines second lateral extension 360 extends laterally from outer abutment surface 366 in the range of about 1.5 to about 5.0 millimeters. More preferably, it extends in the range of about 2.5 to about 3.5 millimeters. Most preferably, it extends about 3.0 millimeters. In preferred embodiments, first and second lateral extensions 358 and 360 extend substantially equal distances from their respective abutment surfaces 368 and 366.

The sheet S6 may include centering notches N1, N2 indicating a middle point for application of the completed grip sheet to mounting tube T to form complete grip G (see FIGS. 48 through 50). Alternatively, the notches N1, N2 are not included. Sheet S6 is coupled to mounting tube T to form a grip, as shown, for example, in FIG. 76 and described herein below.

FIGS. 37, 38, and 39 show another preferred embodiment of the present invention. Coupled sheet S7 comprises four main portions in the illustrated embodiment. In FIG. 37, inner strength sheet 416 is similar to inner strength sheet 316 used in coupled sheet S6. Outer multilayered sheet 402 defines a first opening 418 and an additional second opening 430. First opening 418 is shown as a modified oval which is defined by a first inner region 492 of the sheet 402. However, first opening 418 may be shaped as a circle, an oval, a square, a rectangle, or any of a variety of different shapes, either regular or irregular in size and dimension. Further, these shapes may be wholly enclosed within sheet 402, as illustrated by opening 418, or they may border on the edge of sheet 402 and include an outer peripheral extremity of the sheet 402 as illustrated by second opening 430. Second opening 430 is defined by a second inner region 498 of the sheet 402.

First insert 410 is shaped to correspond to first opening 418 and is defined by an outer region 490. Though the materials may be different, first insert 410 is preferably the same thickness as outer multilayered sheet 402 such that sheet S7 is substantially the same thickness when measured through first insert 410 and through outer sheet 402 after first insert 410 and outer sheet 402 are adhered to inner strength sheet 416. Similarly, second insert 422 is shaped to correspond to opening 430 and is defined by an outer region 496. Preferably, second insert 422 includes centering notches N1, N2. In alternative embodiments, notches are not included. The shape of second insert 422 and corresponding second opening 430 are for illustration purposes only and many other shapes are envisioned to be included in the present disclosure. Like first insert 410, second insert 422 is preferably the same thickness as outer multilayered sheet 402 even if the materials selected to make second insert 422 differ from the materials selected to make sheet 402. The inserts 410 and 422 in one embodiment define a surface area of at least 3 square inches to facilitate each of handling and to provide a significant area of highlighting to provide a pleasing appearance. In alternative embodiments, inserts may be smaller or larger, and included in lesser and fewer numbers, to achieve desired effects.

First insert 410 is preferably secured to inner strength sheet 416 by an adhesive on inner surface 416 of first insert 410. First insert 410 may also be secured to inner sheet 416 by an adhesive on outer surface 448 of inner sheet 416. First insert 410 and inner sheet 416 may also be coupled by a combination of adhesive on each of inner surface (not shown) of first insert 410 and outer surface 448 of inner sheet 416. The interfaces between inner sheet 416 and outer sheet 402, and inner sheet 416 and first insert 410, partially define intermediate interface 462 (FIG. 39). First insert 410 may also be directly coupled to outer sheet 402. First insert 410 preferably defines an outer abutment surface 412. Outer abutment surface 412, in turn, is comprised of an outer abutment surface 412a corresponding to outer tactile layer 434 of first insert 410 and an outer abutment surface 412b corresponding to inner strength layer 436 of first insert 410. First opening 418 defines outer abutment surface 420, which, in turn, is comprised of an outer abutment surface 420a corresponding to outer tactile layer 414 of outer sheet 402 and an outer abutment surface 420b corresponding to inner strength layer 412 of outer sheet 402.

FIG. 39 is a cross-sectional view of first insert 410 and outer sheet 402 coupled with inner sheet 416 and shows outer attachment interface 460 between outer abutment surface 412 of first insert 410 and outer abutment surface 420 of outer sheet 402. Preferably, outer abutment surfaces 412a and 420a are coupled to form outer attachment interface 460a while outer abutment surfaces 412b and 420b are coupled to form outer attachment interface 460b. The outer surface 448 of inner sheet 416 cooperates with the inner surface 416 of first insert 410, the inner surface 428 of second insert 422, and the inner surface 444 of outer sheet 402 to define intermediate attachment surface 462.

FIG. 39 also shows an intermediate attachment interface 462. Intermediate attachment interface 462 comprises intermediate attachment surfaces 462a, 462b, and 462c. Intermediate attachment surface 462a is defined by the interface between the outer surface 448 of inner sheet 416 and the inner face 416 of first insert 410. Intermediate attachment surface 462b is defined by the interface between the outer surface 448 of inner sheet 416 and the inner face 444 of outer sheet 402. Intermediate attachment surface 462c is defined by the interface between the outer surface 448 of inner sheet 416 and the inner face 428 of second insert 422. Internal insert seam 400 is generally defined by outer attachment surface 460 and intermediate attachment surface 462a. Insert seam 400 does not extend through inner sheet 416. Such a structure provides additional support similar to the overlapping extension structure discussed herein. Such support helps prevent separation of the outer sheet and the insert from the inner sheet, both along the intermediate attachment interface as well as along the outer attachment interface.

In one embodiment, an adhesive is used to couple surfaces 412 and 420. In an alternative embodiment, an adhesive is used to couple outer abutment surfaces 412*b* and 420*b*. Outer abutment surfaces 412*a* and 420*a* are preferably coupled with a different adhesive, e.g. injected liquid polyurethane. Polyurethane may be inserted by a nozzle, needle, pen, or the like (not shown). Excessive coupling agent, be it adhesive, liquid polyurethane, or some other agent known to those of skill in the art, may be removed from outer surface 498 of sheet S7 to maintain its generally uniform thickness by buffing, scrubbing, wiping, or similar means. Alternatively, the coupling agent is not removed.

Second insert 422 is coupled to outer sheet 402 and inner strength sheet 416 in a similar manner. An advantage of embodiments of the present invention includes the possibility of incorporating multiple colors in innovative designs on a grip while maintaining the integrity of the outer surface of the grip, including its substantially uniform thickness, its tacky feel, and its ability to cushion the user's hands.

Coupled multilayered sheet S7 is coupled to mounting tube T to form a grip, as shown, for example, in FIG. 78 and described herein below.

Referring now to FIGS. 40 and 41, there is shown yet another embodiment of the present invention. Coupled multilayered sheet S8 is formed from components similar to those used to form sheets S6 and S7. Inner strength layer 516 is coupled to outer multilayered sheets 502*a* and 502*b* such that first and second lateral extensions 558 and 560, respectively, are formed, as shown in FIG. 41. Preferably, sheet S8 is shaped such that when it is wrapped about a mounting tube T, it generally covers exposed surface 610 of mounting tube T as described below. Outer sheets 502*a* and 502*b* may include centering notches N1, N2. In some embodiments, notches N1, N2 are not included.

Outer sheets 502*a* and 502*b* are preferably secured to inner strength sheet 516 by an adhesive on their inner surfaces (not shown). Outer sheets 502*a* and 502*b* may also be secured to inner sheet 516 by an adhesive on outer surface 548 of sheet 516. Outer sheets 502*a* and 502*b* may also be coupled to inner sheet 516 by a combination of adhesive on each inner surface of outer sheets 502*a* and 502*b*, respectively, and outer surface 548 of inner sheet 516.

Desirably, outer sheet 502*a* may be directly coupled to outer sheet 502*b*. Sheet 502*a* defines an outer abutment surface 536*a*. Outer abutment surface 536*a*, in turn, comprises an outer abutment surface 536*aa* corresponding to outer tactile layer 514*a* of outer sheet 502*a* and an outer abutment surface 536*ab* corresponding to inner strength layer 512*a* of outer sheet 502*a*. Outer sheet 502*b* defines an outer abutment surface 536*b*. Outer abutment surface 538*b*, in turn, comprises an outer abutment surface (not shown) corresponding to outer tactile layer 514*b* of outer sheet 502*b* and an outer abutment surface (not shown) corresponding to inner strength layer 512*b* of outer sheet 502*b*. Preferably, outer abutment surfaces 536*a* and 536*b* form an internal outer attachment interface 564. In this embodiment, outer attachment interface 564 preferably extends substantially the distance between top region 504 of outer sheet 502 and bottom region 506 of outer sheet 502, thereby defining first and second sections of outer sheet 502. In alternative embodiments, outer sheet 502 may include additional sections connected in a similar manner.

Outer surface 548 of inner sheet 516 cooperates with inner surfaces (not shown) of outer sheets 502*a* and 502*b*, respectively, to define intermediate attachment interface 566. Intermediate attachment interface 566, in turn, comprises intermediate attachment interface 566*a* corresponding to outer surface 548 of inner sheet 516 and the inner surface of outer sheet 502*a* and intermediate attachment interface 566*b* corresponding to outer surface 548 of inner sheet 516 and the inner surface of outer sheet 502*b*. Internal seam 520 is generally an interface connecting portions of sheet 502 other than the interface between first and second lateral extensions 558 and 560. Structures described above provide additional support to sheet interfaces similar to the overlapping extension structure discussed herein to resist the forces imparted on the grip as it is used by the fisher.

In the illustrated embodiment, first side region 508*b* of outer sheet 502*b* is an outer side region 508*b* of outer sheet 502. Outer side region 508*b* of outer sheet 502 cooperates with first side region 524 of inner sheet 516 to define first lateral extension 558. Similarly, second side region 510*a* of outer sheet 502*a* is also an outer side region 510*a* of outer sheet 502. Outer side region 510*a* of outer sheet 502, in turn, cooperates with second side region 526 of inner sheet 516 to define second lateral extension 560.

Coupled multilayered sheet S8 is, for example, coupled to mounting tube T to form a grip, as shown, for example, in FIG. 79 and described herein below.

Note that an added advantage of the present invention is that it allows for multiple variations to a grip which may include additional vertical sheets, as shown in, for example, FIGS. 40 and 41. In other embodiments, not shown, multiple horizontal sheets are incorporated with and without the other modifications described herein. In still other embodiments, as will be understood by one of skill in the art, multiple inner strength layers are used in conjunction with various designs while still keeping within the spirit of the present disclosure.

Figure 57:
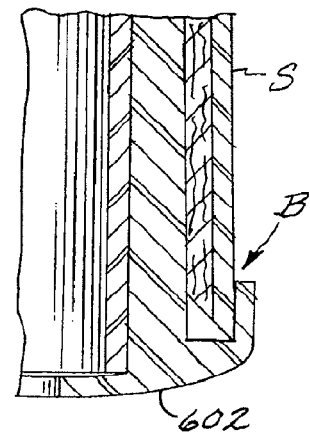
FIG. 57 is a vertical sectional view taken in enlarged scale along line 57-57 of FIG. 50.

Referring now to FIGS. 42 through 45, there is shown a mounting tube T preferably formed of a resilient material such as a natural or synthetic rubber or plastic. Mounting tube T includes an integral cover 602 at its bottom end 650, while the top end 652 of mounting tube T is formed with an integral ring 604. Mounting tube T has a surface 610 extending between the underside of cover 602 and the top side of ring 604. The underside of cover 602 is formed with a downwardly extending slot 620 which wraps circumferentially around mounting tube T. Slot 620 is formed by a lip 654 extending upwardly from cover 602. In one embodiment, the lip 654 is a circumferential lip. Lip 654 defines an inner surface 628 facing surface 610 of mounting tube T, an upper surface 622 facing upward from cover 602, and an outer surface 624 facing away from surface 610 of mounting tube T. Downwardly extending lip 654 extends over a portion 626 of surface 610 of mounting tube T. The lower most portion of slot 620 is defined by an inner upwardly facing surface 658. Preferably, lip 654 is formed so as to resist flexing away from surface 610 of mounting tube T. Slot 620 receives, for example, skived bottom region B of any of the sheets S1-S8 (FIG. 57).

Figure 56:
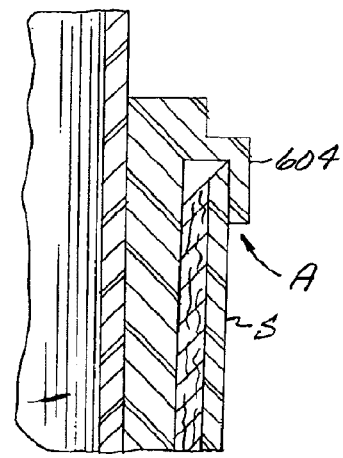
FIG. 56 is a vertical sectional view taken in enlarged scale along line 56-56 of FIG. 50.
Figure 55:
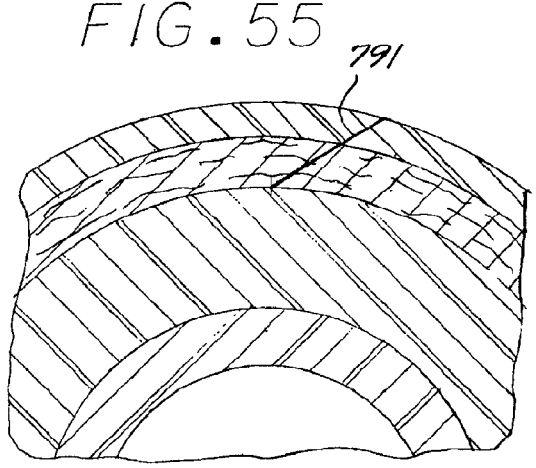
FIG. 55 is an enlarged view of the encircled area designated 55 in FIG. 53 showing a seam between the side edges of the single sheet.

Similarly, ring 604 of mounting tube T is formed with a downwardly extending slot 630 defined by a portion 636 of surface 610 of mounting tube T and lip 656 extending downwardly from ring 604 and preferably wrapping circumferentially around mounting tube T. Lip 656 defines an inner surface 638 facing mounting tube T, a lower surface 632 facing downward from ring 604, and an outer surface 634 facing away from surface 610 of mounting tube T. Downwardly extending lip 656 extends over portion 636 of surface 610 of mounting tube T. The upper most portion of slot 630 is defined by an inner downwardly facing surface 660. Though lip 656 may flex outward from mounting tube T, it preferably resists remaining in a fully flexed position in which it lays flat, thereby fully exposing mounting tube T surface 636. In alternative embodiments, outer surface 634 tapers toward inner surface 638, or inner surface 638 tapers toward outer surface 634. Slot 630 receives, for example, skived top region A of any of sheets S1-S8 (FIG. 56). Preferably, mounting tube T will be formed with centering notches 605 to match the centering notches N1, N2 of the sheet S.

In one embodiment, the lip 656 of the ring 604 has a thickness or width RLW less than a thickness or width CLW of the lip 654 of the cap 602. The width RLW may be less than the width CLW to facilitate the lip 656 of the ring 604 bending outwardly more easily, so as to more easily receive the end of a sheet S. In one embodiment, the ratio of the width RLW to the width CLW is between about 1.1:1 to 1.9:1. In another embodiment, the ratio is between about 1.3:1 and 1.7:1. In still another embodiment, the ratio is between about 1.4:1 and 1.5:1.

In addition, in one embodiment the ring 604 has an edge 661 having an edge width EW and an edge length EL. The dimensions of the edge 661 in one embodiment are configured to further enable the lip 656 to bend outwardly. In one embodiment, the edge width EW is between about 1 and 5 mm. In another embodiment, the edge width EW is between about 1.5 and 3.5 mm. In yet another embodiment, the edge width EW is between about 2 and 2.5 mm. The edge length EL in one embodiment is between about 1 and 9 mm. Alternatively, the edge length EL is between about 2 and 7 mm or about 3 and 6 mm.

Moreover, in certain embodiments, the ratio of the width of the inner downwardly facing surface 660 to the edge width EW further enables the lip 656 to project outwardly. This ratio in one embodiment is between about 0.7:1 to 2.2:1. In another embodiment, the ratio is between about 1.2:1 and 2.0:1. In yet another embodiment, the ratio is between about 1.4:1 and 1.8:1.

FIGS. 42 through 45 also illustrate various dimensions of the mounting tube T. In the depicted embodiment, the mounting tube T has an interior length L and interior widths W1 and W2. In addition, the depicted cap 602 and ring 604 have widths W3 and heights CL and RL, respectively. The illustrated embodiment also depicts a cap depth CD and a ring depth RD.

The interior length L of the mounting tube T is depicted as the length between the inner upwardly facing surface 658 of the cap 602 and the inner downwardly facing surface 660 of the ring 604. The interior length L in one embodiment is about 150 to 250 mm. In another embodiment, the interior length L is about 180 to 220 mm. In still another embodiment, the interior length L is about 200 to 215 mm. Other lengths may be chosen to allow a grip G incorporating the mounting tube T to fit longer or shorter fishing pole rods.

The interior length L of the mounting tube T may be further subdivided into interior sublengths L1 and L2. In one embodiment, the interior sublength L2 is longer than the interior sublength L1, though in other embodiments, the interior sublengths L1, L2 are equal or approximately equal. The ratio of the interior sublength L2 to the interior sublength L1 in one embodiment is between about 1:1 and 2:1. In another embodiment, the ratio is between about 1:1 and 1.5:1. In yet another embodiment, the ratio is between about 1.1:1 and 1.3:1. By varying the interior sublengths L1 and L2, the mounting tube T may be coupled with a grip G of such a length as to conform more comfortably to the hand of a particular user.

The interior width W1 of the mounting tube T is depicted as the widths of the tube between the cap 602 and ring 604 and proximate to the cap 602 and ring 604. In the depicted embodiment, the interior widths W1 of each end of the mounting tube T are equal or approximately equal. In alternative embodiments, the widths W1 of each end of the mounting tube T are not equal. The depicted width W2 corresponds to the width of an interior portion of the mounting tube T, and more particularly in one embodiment, to the narrowest interior portion of the mounting tube T. The depicted embodiment of the width W2 illustrates that the width W2 of certain embodiments is smaller than the widths W1. Consequently, the mounting tube T between the cap 602 and ring 604 tapers from each end of the mounting tube T to an interior portion having width W2.

In one embodiment, the differing widths W1, W2 give the mounting tube T a cross-section having an hourglass or substantially hourglass shape. Thus, in one embodiment, a grip G incorporating the mounting tube T also has an hourglass shape. A grip G having this hourglass shape is able to more comfortably fit in the hand of a user in certain embodiments. Though not shown, in alternative embodiments, the width W2 may be equal to or greater than the width W1. Such embodiments might for example be preferred by a user with larger hands.

In one embodiment, the ratio of the width W1 to the width W2 is between about 0.9:1 and 1.8:1. In another embodiment, the ratio is between about 1:1 and 1.4:1. In yet another embodiment, the ratio is between about 1.1:1 and 1.2:1.

Turning to the dimensions of the cap 602 and ring 604, the cap 602 and the ring 604 each have a width W3. In one embodiment, the width W3 of the cap 602 is equal or substantially equal to the width W3 of the ring 604. However, in alternative embodiments, differing widths W3 may be chosen. In addition, the cap 602 has a height CL, and the ring 604 has a height RL. In one embodiment, these heights CL, RL are also equal or substantially equal. However, in alternative embodiments, differing heights CL, RL may also be chosen.

Also depicted are the cap depth CD and the ring depth RD. The cap depth CD is a measurement of the distance from the upper surface 622 to the inner upwardly facing surface 658. Likewise, the ring depth RD is a measurement of the distance from the lower surface 632 to the inner downwardly facing surface 660. In one embodiment, the cap depth CD and the ring depth RD are equal or substantially equal; however, these depths CD, RD may also differ in length.

The mounting tube T between the cap 602 and ring 604 in certain embodiments has varying wall thicknesses 615, 617. The wall thickness 617 corresponds to the ends of the mounting tube T between the cap 602 and the ring 604, and the wall thickness 615 corresponds to the interior portion of the mounting tube T, where the mounting tube T has width W2. In one embodiment, the wall thickness 617 is greater than the wall thickness 615. In certain embodiments, the wall thickness tapers from the thickness 617 at one or both ends to the thickness 615. By having a lesser wall thickness 615 in the interior portion, the mounting tube T is more flexible at the interior portion having thickness 615 than at the ends having thickness 617. In some instances, the differing wall thicknesses 615, 617 enable a grip G incorporating the mounting tube T to conform more comfortably to a user's hand.

Referring now to FIGS. 46 through 55 the sheet S is shown being applied to mounting tube T to form a grip G. In FIG. 46 the inner surface of the fibrous layer 700 is shown receiving an adhesive 790 by means of a nozzle, brush or the like. In FIG. 47 the exterior surface of the mounting tube T is shown receiving an adhesive 790 by means of a nozzle, brush or the like.

In FIG. 48 shows the sheet S being wrapped around and adhered to the mounting tube T. During this operation the centering notches will be used to align the sheet S with the mounting tube T. Also, the lower edge of the sheet S will be manually inserted within the circumferential slot 620 of the cap 602, while the upper edge of such sheet S is manually inserted within the slot 630 formed within the ring 604. As indicated above, the skived side edges of the sheet S will be adhered together by a suitable adhesive 790 so as to define a seam 791 (FIG. 55) extending through the sheet. Because of the skived side edges, the seam 791 extends through the sheet S at an angle relative to the depth of the sheet S so as to increase the length of such seam 791 as compared to a seam extending parallel to the depth of the sheet S. Increased length of the seam 791 affords a stronger bond. The seam 791 is particularly strong where it joins the fibrous layers together. A suitable adhesive 790 has the chemical formula polychloroprene ($C_4H_5Cl$) and Toluene ($CH_5CH_3$). As the sheet S is being wrapped about and adhered to mounting tube T, the mounting tube T will be temporarily supported on a collapsible mandrel 792 in a conventional manner. The first form of completed grip G is shown in FIG. 50.

Referring to FIGS. 56 and 57, it will be seen that the bottom edge of the sheet S is securely disposed within cap slot 620 and the upper edge of the sheet S is securely disposed within the ring slot 630. The completed grip is then removed from mandrel 792 and is ready to be slipped onto and adhered to the shaft of a fishing pole in a conventional manner.

As shown in FIGS. 58 through 63, first and second lateral extensions 858 and 860, respectively, of a sheet S will be coupled together to form a seam 870. Because of overlapping extensions 858, 860, seam 870 extending generally through sheet S from surface 610 of mounting tube T to outer surface 898 of sheet S does so in step-like increments. Such a construction results in a particularly strong interface, especially where the various strength layers are coupled together.

In a preferred embodiment, seam 870 includes three attachment interfaces 872, 874, and 876, as shown in FIG. 63. Inner attachment interface 872 is preferably formed between at least a portion of inner abutment surfaces 854 and 864. Intermediate attachment interface 874 is preferably formed between at least a portion of intermediate abutment surfaces 852 and 862. Outer attachment interface 876 is preferably formed between at least a portion of outer abutment surfaces 868 and 866. In a preferred embodiment, outer attachment interface 876 comprises outer attachment interface 876a defined by the intersection of outer attachment surface 866a and outer attachment surface 868a and outer attachment interface 876b defined by the intersection of outer attachment surface 866b and outer attachment surface 868b.

Though it is preferred that seam 870 include all three interfaces 872, 874, and 876, other embodiments may include a seam in which only portions of intermediate interface 874 and portions of outer interface 876 are used to secure the seam 870. Such a seam maintains its strength predominantly because it includes at least one interface in which portions of strength layers are joined. One embodiment of a completed grip G is shown in FIG. 58.

Referring now to FIGS. 64 through 66 there is shown another modification of a grip G. In this modification, after the seam 791 has been formed, a small quantity of hot polyurethane 996 is coated over the seam by a nozzle or brush, as shown in FIG. 64. After the polyurethane hardens, it may be buffed by a suitable brush 997 or the like to smoothly blend into the surface of the grip, as indicated in FIG. 65. Alternatively, the polyurethane is not buffed.

Figure 67:
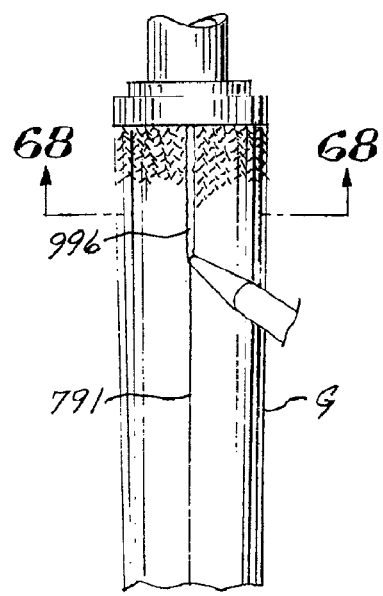
FIG. 67 is a broken side elevational view showing another modification of a grip.
Figure 70:
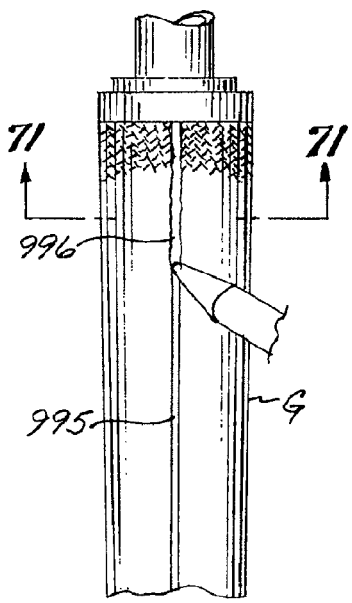
FIG. 70 is a broken side elevational view of another modification of a grip.
Figure 68:
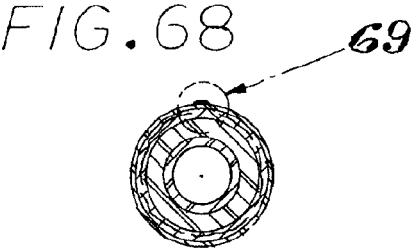
FIG. 68 is a horizontal sectional view taken along line 68-68 of FIG. 67.
Figure 71:
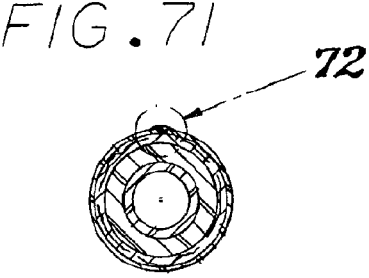
FIG. 71 is a horizontal sectional view taken along line 71-71 of FIG. 70.
Figure 69:
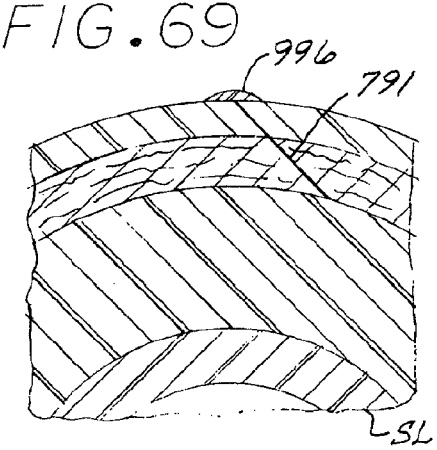
FIG. 69 is an enlarged view of the encircled area designated 69 in FIG. 68.
Figure 72:
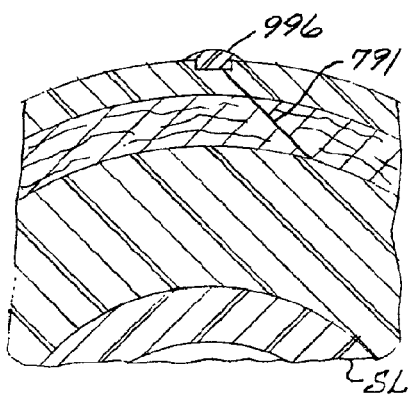
FIG. 72 is an enlarged view of the encircled area designated 72 in FIG. 71.

Referring to FIGS. 67 through 72 there is shown a modification of the grip. In FIGS. 67 through 69, hot polyurethane 996 is shown being coated over the seam 791 by a nozzle or brush. In FIGS. 70 through 72, a nozzle or brush applies 70-72 hot polyurethane 996 to fill a depression 995 formed by a hot mold (not shown).

It should be understood that the outer surface of a grip embodying the present invention may be coated by means of a brush or spray with a thin layer of polymer such as polyurethane (not shown) to protect such surface, add tackiness thereto, and increase the durability thereof.

Figure 73:
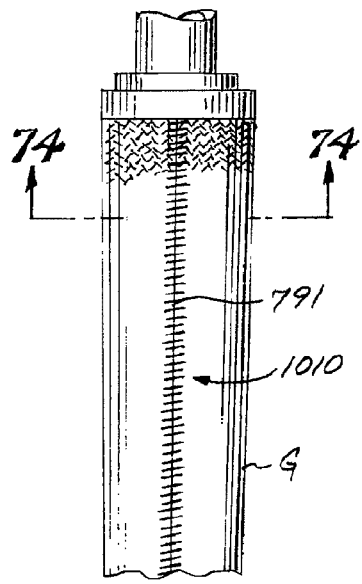
FIG. 73 is a broken side elevational view of another modification of a grip.
Figure 74:
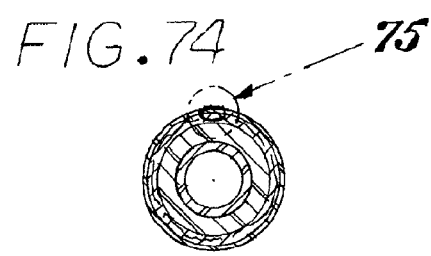
FIG. 74 is a horizontal sectional view taken along line 74-74 of FIG. 73.
Figure 75:
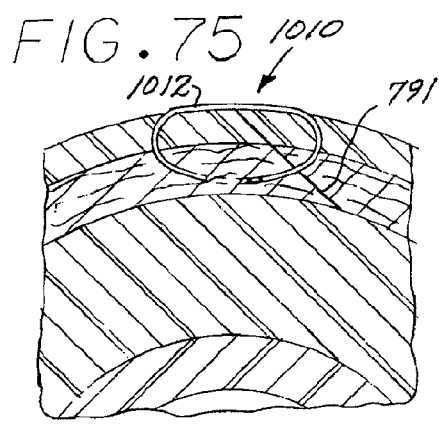
FIG. 75 is an enlarged view of the encircled area designated 75 in FIG. 74.

Referring to FIGS. 73 through 75, there is shown another modification of the grip. Stitching 1010 is applied to the seam 791 to reinforce the seam 791. As shown in FIG. 75, the stitching 1010 includes stitches 1012, which in one implementation are thread stitches 1012. Stitching 1010 may be used alone or in conjunction with hot polyurethane.

Figure 82:
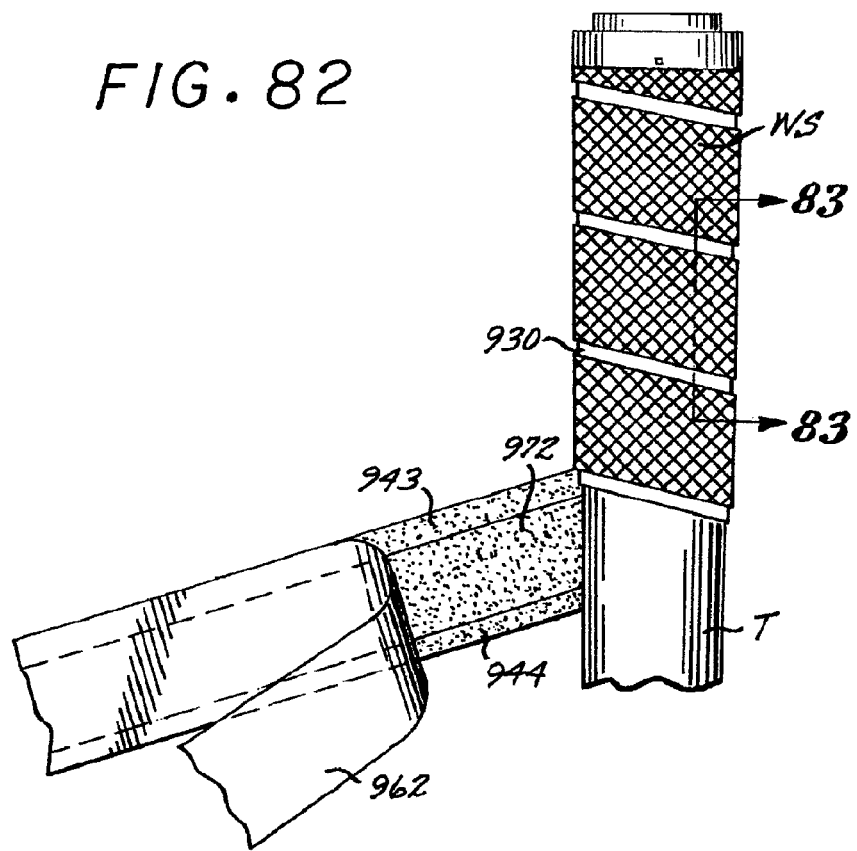
FIG. 82 is broken side elevational view showing a multi-layered member being spirally wound around a tube according to one embodiment.
Figure 83:
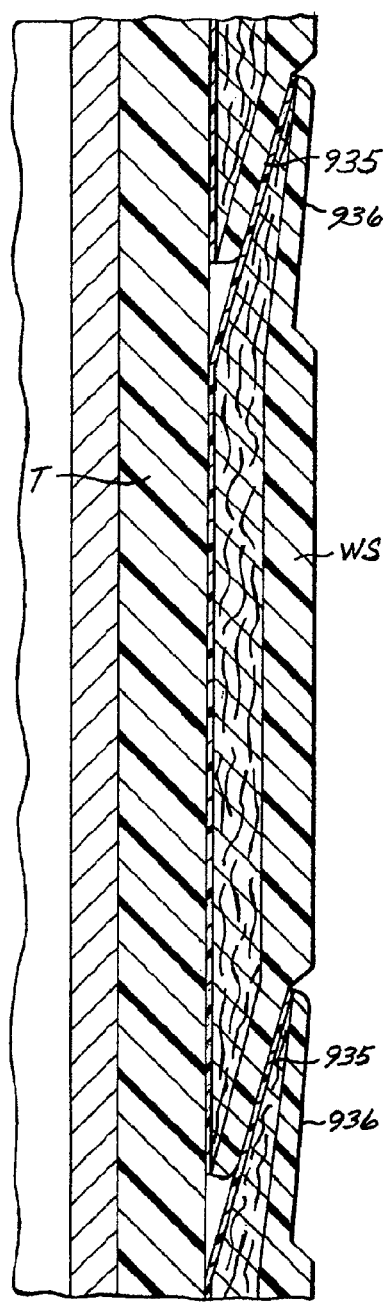
FIG. 83 is a sectional view taken along the line 83-83 of FIG. 82.
Figure 84:
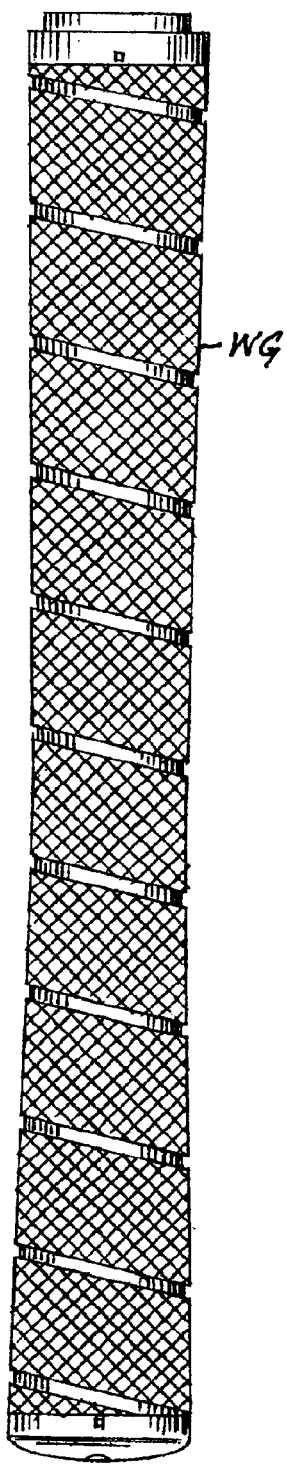
FIG. 84 is a rear view of a grip according to one embodiment.

Referring now to FIGS. 81 through 84, there is shown another modification of the grip. In lieu of the above disclosed sheet type grips, spirally wrapped grip WG includes a mounting tube T and a strip WS spirally wrapped around the tube T. FIG. 84 shows such a spirally wrapped grip WG. Tube T is constructed in a similar manner as discussed above.

In some embodiments, strip WS includes an outer layer 910 bonded to an inner layer 920 as disclosed above with respect to sheet S. However, rather than including one or more substantially vertical seams, spirally wrapped grips WG include one or more seams 930 or channels helically extending along the tube T.

The strip WS can be cut or otherwise formed from a larger sheet of material. In one embodiment, the strip WS can be modified by placing it into a mold that compresses the side edges 935, 936 to form heat compressed side edges 935, 936 from the outer layer 910 toward the inner layer 920. In other embodiments, the side edges 935, 936 are formed by heated rollers. At the same time or separately, the mold, heated platen, or rollers may apply a friction-enhancing pattern to the strip WS.

In some embodiments, rather than compressing the side edges 935, 936 with a mold or the like, the outer layer 910 can be densified to form a compressed densified area (not shown) by applying heat to the outer layer 910 through the inner layer 920. In some embodiments, one side of the strip may be compressed and one side densified.

Figure 81:
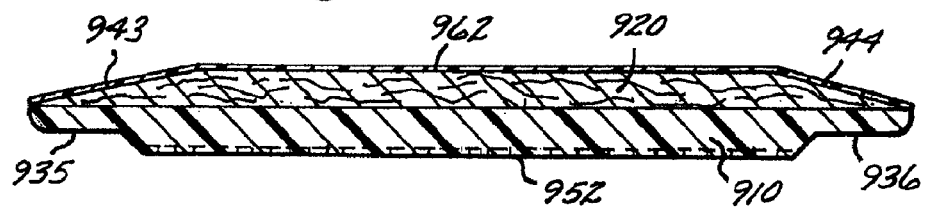
FIG. 81 is a cross-sectional view of multi-layered member according to one embodiment.

In one embodiment, the edges 943, 944 are skived from the inner side of the inner layer 920. In some embodiments, as shown in FIG. 81, only the inner layer 920 or a portion thereof is skived. In some embodiments, both the inner layer 920 and at least a portion of the outer layer 910 are skived. In some embodiments, skiving is performed on the inner layer 920 and the entire outer layer 910.

The strip WS of various implementations includes a backing layer 962 that may be peeled off to reveal an adhesive 972 applied to the inner layer 920. Alternatively, the adhesive 972 may be brushed, sprayed, or otherwise applied to the strip WS to enable the strip to adhere to the tube T.

Portions at the leading and trailing ends of the strip WS can be included, cut at an angle so that the strip WS tapers toward the ends to facilitate application of the strip WS to the tube T. In some embodiments, the strip WS can be spirally wrapped around the tube T such that the side edges 935, 936 are abutting and pressed together.

As shown in FIGS. 82 and 83, in some embodiments the strip WS is spirally wrapped around the tube T such that the abutting side edges 943, 944 overlap each other. Generally, the wrapping process starts from the cap and ends at the ring. Alternatively, the wrapping process starts from the ring and ends at the cap.

In some embodiments, one side of the strip WS is compressed and the other is densified. Thus, when overlapping the side edges of the strip, the compressed side is on the bottom and the densified side is on the top such that the densified side overlaps the compressed side to create a thin seam 930. This arrangement preferably provides a substantially smooth gripping surface.

In some embodiments, the side edges 935, 936 abut, but do not overlap. In such embodiments, the side edges need not be skived. In some embodiments, the adhesive 972 can be included between the abutting side edges 935, 936, whether they overlap or not.

Various implementations include two strips WS with contrasting characteristics, such as color, that are joined together and then both wrapped around the tube T. Also, friction enhancing patterns and indicia on one or more of the strips WS may be included. The patterns can be different on different strips WS. Moreover, cut-outs and inserts may be included as described above, and one or more strips WS can be joined like the multi-segment single sheet described above. Finally, a strip WS may be constructed with an outer layer made according to the method of making the outer layer described above with respect to sheet S5.

Figure 85:
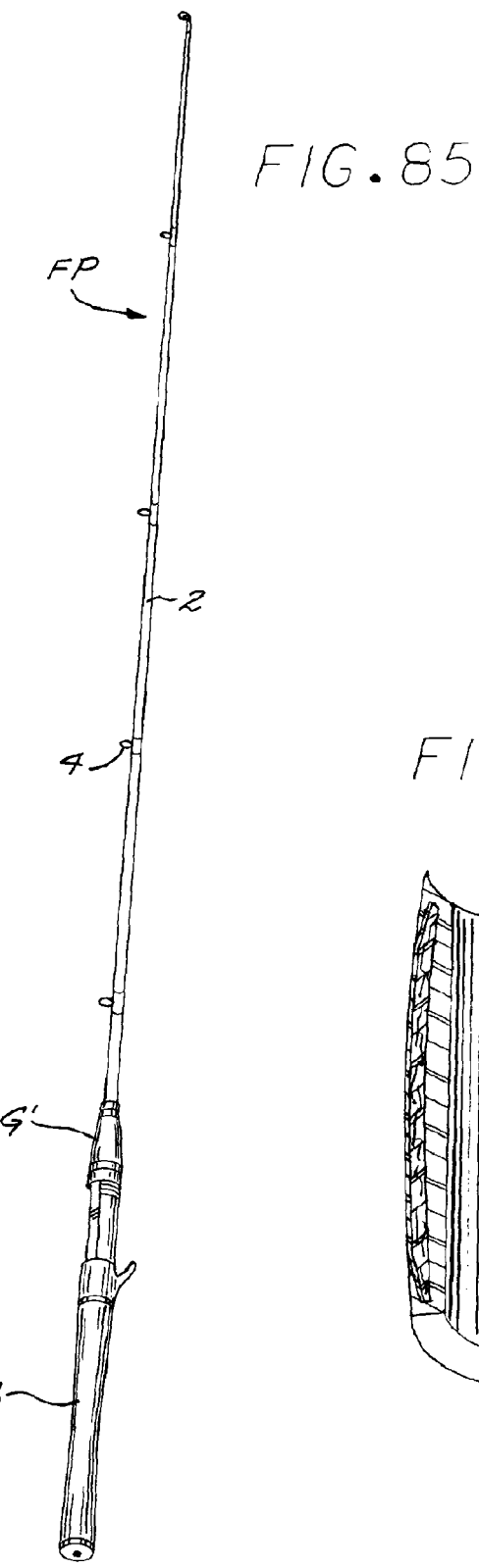
FIG. 85 is a perspective view of a fishing pole incorporating grips according to certain embodiments.
Figure 86:
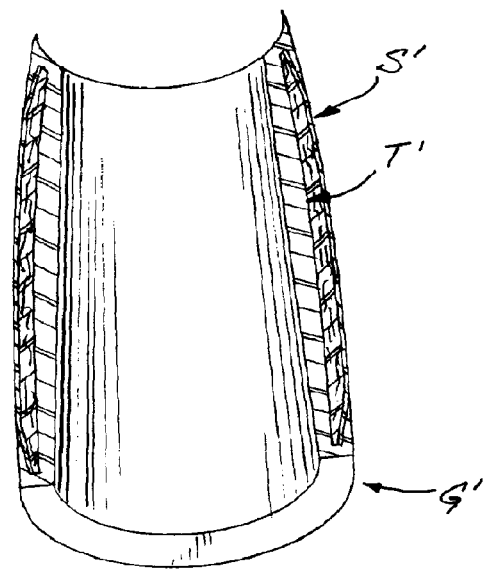
FIG. 86 is a cross-sectional view of a grip embodiment shown in FIG. 85.

Referring now to FIGS. 85 and 86, there is shown an additional finger grip that may be incorporated on a fishing pole alone in combination with any one of the above described embodiments or with a traditional fishing pole grip. It may be advantageous to include a finger grip to provide an additional location for the user to support the fishing pole during use. In the illustrated embodiment, fishing pole FP includes main grip G and finger grip G'. Embodiments of finger grip G' include tube T' forming the inner portion of the grip and an outer gripping surface defined by sheet S'. Sheet S' may be formed according to any of the above described methods. In some embodiments, finger grip G' includes a strip (not shown) rather than a sheet to form the gripping surface.

Embodiments of tube T' of finger grip G' include first and second open ends which are sized to accommodate the shaft of fishing pole FP. Preferably, the outer surface of the top end of the tube T' closest to the line guides 4 is tapered to provide a relatively smooth transition from the finger grip G' to the shaft of the fishing pole FP. In some embodiments, the ratio of the length of the gripping surface of the finger grip G' along the axis of the fishing pole FP to the length of the grip G along the axis of the fishing pole FP is in the range of approximately 1:7 and 2:3. In some embodiments, the ratio of the grip lengths is in the range of approximately 1:6 and 2:9. The smaller sized finger grip G' preferably provides a comfortable and secure gripping portion on the fishing pole FP while minimizing the weight that is added.

Any features of the embodiments shown and/or described in the Figures that have not been expressly described in this text, such as distances, proportions of components, etc. are also intended to form part of this disclosure. Additionally, although these inventions have been disclosed in the context of various embodiments, features, aspects, and examples, it will be understood by those skilled in the art that the present inventions extend beyond the specifically disclosed embodiments to other alternative embodiments and/or uses of the inventions and obvious modifications and equivalents thereof. Accordingly, it should be understood that various features and aspects of the disclosed embodiments can be combined with, or substituted for, one another in order to perform varying modes of the disclosed inventions. Thus, it is intended that the scope of the present inventions herein disclosed should not be limited by the particular disclosed embodiments described above.

What is claimed is:

1. A grip for a fishing pole, such grip comprising:
   a flexible mounting tube configured to engage a rod and having an outwardly facing surface;
   a sheet that includes a polyurethane outside layer and an inside layer, such sheet having a configuration generally corresponding to the outwardly facing surface of the flexible mounting tube, said sheet comprising an interior surface and an exterior surface, a first end and a second end, and a pair of side edges;
   the sheet being wrapped about and bonded to the mounting tube; and
   wherein the exterior surface of the sheet includes heat formed friction enhancing features wherein the mounting tube comprises a cross-section having a substantially hourglass shape.

2. The grip of claim 1, wherein the sheet comprises a substantially hourglass shape.

3. The grip of claim 1, wherein the outside layer includes multiple colors.

4. The grip of claim 1, wherein the side edges of the sheet define a seam extending from the interior surface of the sheet to the exterior surface of the sheet.

5. The grip of claim 4, wherein the seam extends generally longitudinally along the grip.

6. The grip of claim 4, wherein the seam extends spirally around the tube.

7. The grip of claim 1, wherein the mounting tube comprises an integral cap at a proximal end of the mounting tube and an integral ring at a distal end of the mounting tube, the integral cap having a first width and the integral ring having a second width.

8. The grip of claim 7, wherein the integral cap has a first length and the integral ring has a second length, wherein the first length is substantially equal to the second length.

9. The grip of claim 7, wherein the integral cap has a first width and the integral ring has a second width, wherein the first width is substantially equal to the second width.

10. The grip of claim 1, wherein the mounting tube comprises:
    an interior length bounded by a cap and a ring, the interior length having a first end with a wall with a first thickness and a second end with a wall with a second thickness; and
    the interior length comprising an interior portion, the interior portion comprising a wall with a third thickness, wherein the first and second thicknesses are greater than the third thickness.

11. The grip of claim 1, wherein the mounting tube comprises:
    an interior length bounded by a cap and a ring, the interior length having a first end and a second end; and
    the interior length comprising an interior portion;
    wherein the interior portion is more flexible than the first and second ends.

12. The grip of claim 4, wherein the seam is stitched.

13. The grip of claim 1, wherein a ratio of a height of the inside layer to a height of the polymer outside layer is between about 5:1 and 8:1.

14. A method of making a grip for a fishing pole, the method comprising:
    providing a flexible mounting tube configured to engage a fishing pole and having an outwardly facing surface;

providing a sheet that includes a polymer outside layer and an inside layer, such sheet having a configuration generally corresponding to the outwardly facing surface of the flexible mounting tube, said sheet comprising an interior surface and an exterior surface, a first end and a second end, and a pair of side edges, wherein the exterior surface of the sheet includes heat formed friction enhancing features; and wrapping the sheet about and bonding it to the mounting tube wherein the mounting tube comprises a cross-section having a substantially hourglass shape.

15. The method of claim 14, wherein the sheet comprises a substantially hourglass shape.

16. The method of claim 14, wherein the step of providing the sheet further comprises providing a sheet wherein the outside layer includes multiple colors.

17. The method of claim 16, wherein the step of wrapping the sheet about the mounting tube causes the side edges of the sheet to define a seam extending from the interior surface of the sheet to the exterior surface of the sheet.

18. The method of claim 17, wherein the seam extends generally longitudinally along the grip.

19. The method of claim 17, wherein the seam extends spirally around the tube.

20. The method of claim 14, wherein the mounting tube comprises an integral cap at a proximal end of the mounting tube and an integral ring at a distal end of the mounting tube, the integral cap having a first width and the integral ring having a second width.

21. The method of claim 20, wherein the integral cap has a first length and the integral ring has a second length, wherein the first length is substantially equal to the second length.

22. The method of claim 20, wherein the integral cap has a first width and the integral ring has a second width, wherein the first width is substantially equal to the second width.

23. The method of claim 14, wherein the provided mounting tube comprises:

an interior length bounded by a cap and a ring, the interior length having a first end with a wall with a first thickness and a second end with a wall with a second thickness; and the interior length comprising an interior portion, the interior portion comprising a wall with a third thickness, wherein the first and second thicknesses are greater than the third thickness.

24. The method of claim 14, wherein the mounting tube comprises:

an interior length bounded by a cap and a ring, the interior length having a first end and a second end; and the interior length comprising an interior portion;

wherein the interior portion is more flexible than the first and second ends.

25. The method of claim 17, further comprising the step of stitching the seam.

26. The method of claim 14, wherein a ratio of a height of the inside layer to a height of the polymer outside layer is between about 5:1 and 8:1.

* * * * *